US012138768B2

(12) United States Patent
Hauptmann

(10) Patent No.: US 12,138,768 B2
(45) Date of Patent: Nov. 12, 2024

(54) PRESS-ON ELEMENT FOR A POWER TOOL

(71) Applicant: Hilti Aktiengesellschaft, Schaan (LI)

(72) Inventor: Udo Hauptmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/916,964

(22) PCT Filed: Apr. 7, 2021

(86) PCT No.: PCT/EP2021/059079
§ 371 (c)(1),
(2) Date: Oct. 4, 2022

(87) PCT Pub. No.: WO2021/213806
PCT Pub. Date: Oct. 28, 2021

(65) Prior Publication Data

US 2023/0158656 A1 May 25, 2023

(30) Foreign Application Priority Data

Apr. 21, 2020 (EP) .................................... 20170492

(51) Int. Cl.
*B25D 17/08* (2006.01)

(52) U.S. Cl.
CPC .... *B25D 17/088* (2013.01); *B25D 2217/0038* (2013.01); *B25D 2250/085* (2013.01); *B25D 2250/235* (2013.01)

(58) Field of Classification Search
CPC .......... B25D 17/088; B25D 2217/0038; B25D 2250/085; B25D 2250/235
See application file for complete search history.

(56) References Cited

U.S. PATENT DOCUMENTS

2003/0006566 A1 1/2003 Below et al.
2010/0176561 A1 7/2010 Braun et al.
(Continued)

FOREIGN PATENT DOCUMENTS

DE 102007028486 A1 12/2008
EP 1184136 A1 3/2002
GB 2444849 A * 6/2008 .......... B25D 17/088

OTHER PUBLICATIONS

International Search Report of PCT/EP2021/059079 dated Jun. 9, 2021.

*Primary Examiner* — Anne Marie Antonucci
*Assistant Examiner* — Luis G Del Valle
(74) *Attorney, Agent, or Firm* — Davidson Kappel LLC

(57) ABSTRACT

A power tool, in particular a rotary hammer or combination hammer, containing a percussion-mechanism apparatus for generating percussion pulses on a tool, having a basic body for receiving a rear end of the tool, at least one first and second locking element, each arranged lying in radial openings of the basic body in a reversible manner in a locking position or release position, wherein, in the locking position, the rear end of the tool is held in the basic body and, in the release position, the rear end of the tool can be removed from the basic body, a locking ring for holding the at least first and second locking elements in the locking position, and a press-on element for guiding the at least first and second locking elements in a first axial direction and a second axial direction. The press-on element consists at least partially of an elastic material.

12 Claims, 24 Drawing Sheets

(56) References Cited

U.S. PATENT DOCUMENTS

| | | | | |
|---|---|---|---|---|
| 2011/0073338 | A1* | 3/2011 | Ikuta | B25D 17/24 173/162.2 |
| 2013/0206436 | A1 | 8/2013 | Thorson et al. | |
| 2016/0158929 | A1* | 6/2016 | Brennenstuhl | B25B 23/141 173/48 |
| 2020/0039048 | A1* | 2/2020 | Gottschling | B25D 11/12 |
| 2020/0361070 | A1* | 11/2020 | Stoner | B25D 11/00 |
| 2021/0252680 | A1* | 8/2021 | Herr | B25B 23/0035 |

* cited by examiner

PRESS-ON ELEMENT FOR A POWER TOOL

The present invention relates to a power tool, in particular a rotary hammer or combination hammer, containing a percussion-mechanism apparatus for generating percussion pulses on a tool, having a basic body for receiving a rear end of the tool, at least one first and second locking element, each arranged lying in radial openings of the basic body in a reversible manner in a locking position or release position, wherein, in the locking position, the rear end of the tool is held in the basic body and, in the release position, the rear end of the tool can be removed from the basic body, a locking ring for holding the at least first and second locking elements in the locking position, and a press-on element for guiding the at least first and second locking elements in a first axial direction and a second axial direction.

BACKGROUND

Power tools in the form of a rotary hammer or combination hammer of the type stated at the outset are known in principle from the prior art. Rotary hammers or combination hammers usually have a tool fitting for receiving and holding a tool on the power tool. The tool fittings transmit the torque to the tools that is generated in the drive of the power tools, ensure the transmission of percussion pulses from a percussion-mechanism apparatus to the substrate by allowing limited axial movements, and prevent the tools from falling out of the power tools.

SUMMARY OF THE INVENTION

The components of the tool fitting are exposed to high dynamic vibrations due to percussion-mechanism pulses at high frequencies. If the tools are accelerated by percussion pulses from the percussion mechanism, but this percussion energy cannot be passed on to a substrate to be removed, this is known as blank tool percussions. These blank tool percussions can cause considerable damage to the power tool, since the energy of the percussion pulses is not transferred to the substrate (that is to say material) to be machined, but is degraded on the components of the power tool, and in particular on the tool fitting.

It is an object of the present invention to provide a power tool which provides an improved power tool in which damage to the components of the power tool due to blank tool percussions can be reduced.

The present invention provides a power tool, in particular a rotary hammer or combination hammer, containing a percussion-mechanism apparatus for generating percussion pulses on a tool, having a basic body for receiving a rear end of the tool, at least one first and second locking element, each arranged lying in radial openings of the basic body in a reversible manner in a locking position or release position, wherein, in the locking position, the rear end of the tool is held in the basic body and, in the release position, the rear end of the tool can be removed from the basic body, a locking ring for holding the at least first and second locking elements in the locking position, and a press-on element for guiding the at least first and second locking elements in a first axial direction and a second axial direction.

According to the invention, there is provision that the press-on element consists at least partially of an elastic material. In this way, vibrations on components of the tool fitting that are generated by blank tool percussions can be damped. Owing to the damped vibrations, the components of the tool fitting are less stressed.

According to an advantageous embodiment of the present invention, it may be possible for the press-on element to contain at least one first receiving region for at least partially receiving the at least first and second locking elements. This allows effective transmission of vibrations from the locking elements to the vibration-absorbing press-on element to be achieved.

According to a further advantageous embodiment of the present invention, it may be possible for the press-on element to contain at least one connecting element for rotationally fixedly connecting the press-on element to an actuating cap. The nonrotational connection can prevent unwanted rotation of the press-on element relative to the locking elements.

According to an advantageous embodiment of the present invention, it may be possible for the at least one receiving region of the press-on element to contain a holding device for re-releasably holding the at least first and second locking elements in the receiving region. In this way, the respective locking element can be re-releasably connected to the press-on element in a simple manner.

According to a further advantageous embodiment of the present invention, it may be possible for the holding device to be designed in the form of a first and second elastically deformable lip element, wherein a respective freely movable end of the first and second lip elements are aligned with one another so that, through a cutout between the first and second lip elements, the at least first and second locking element can be at least partially received in the at least one receiving region. As a result, the locking element and the press-on element can be firmly connected to one another to a certain extent. It can thus be ensured that when the press-on element is moved in an axial direction, the locking element is pulled along by the press-on element.

According to an advantageous embodiment of the present invention, it may be possible for the at least one receiving region of the press-on element to contain a spring device for exerting a force in a first axial direction on the at least one pawl element. In this way, the press-on element helps to move the first and second locking elements from the release position back into the locking position.

According to a further advantageous embodiment of the present invention, it may be possible for the spring device to be designed in the form of an elastically deformable elevation in a first axial direction.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
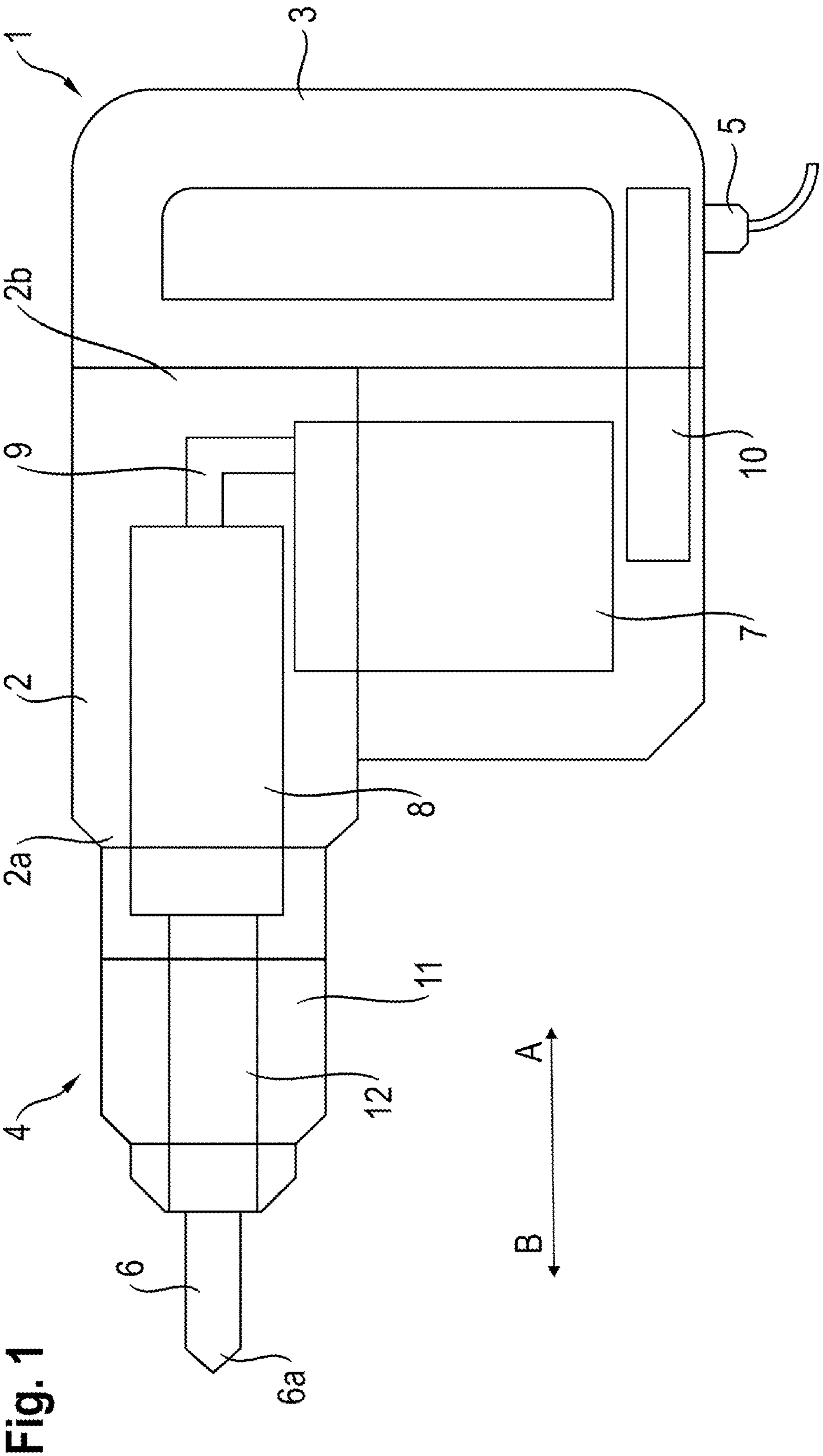
FIG. 1 shows a schematic side view of a power tool in the form of a rotary hammer.
Figure 2:
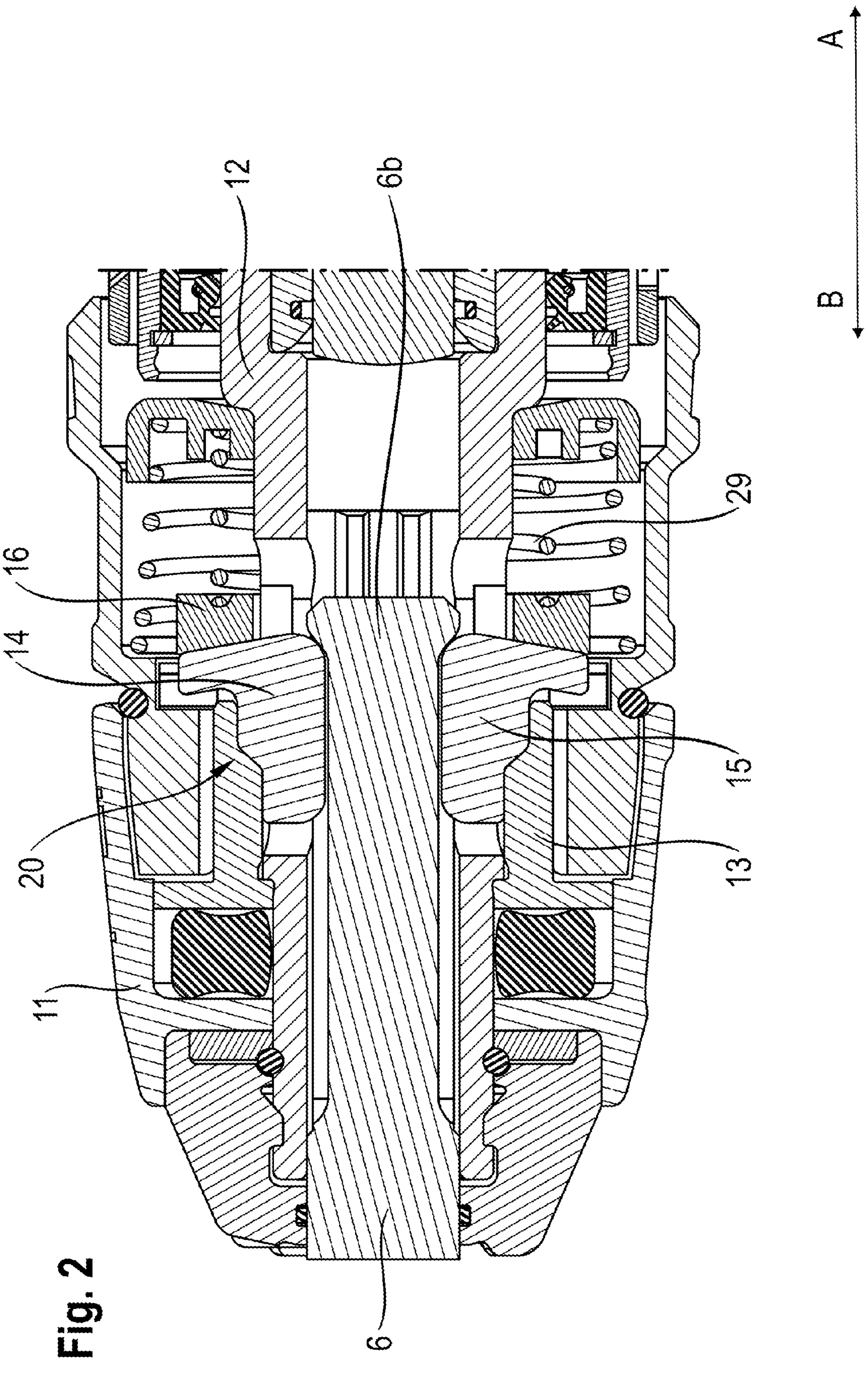
FIG. 2 shows a lateral sectional view of an actuating cap, a first and second locking element, a basic body, a tool and a press-on element according to a first embodiment.

FIGS. 1 and 2 show a power tool 1 in the form of a rotary hammer. The power tool 1 can also be a hammer drill, combination hammer or the like, however.

The power tool 1 substantially contains a tool housing 2, a handle 3, a tool-fitting apparatus 4 and a power supply 5. The tool-fitting apparatus 4 serves to receive and hold a tool 6. The tool 6 is designed as a chisel in the figures and contains a front end 6*a* and a rear end 6*b*. The rear end 6*b* of the tool designed as a chisel is intended to be inserted into the tool-fitting apparatus 4. The handle 3 serves to hold and guide the power tool 1. The power supply 5 serves to supply the power tool 1 with electrical energy and is designed as a power cable in the present exemplary embodiment. The power supply 5 designed as a power cable can be connected to a mains power source, also called a socket. According to an alternative embodiment not shown in the figures, the power supply 5 can also be designed as an accumulator which can be releasably connected to the power tool 1 via a corresponding accumulator interface.

The interior of the tool housing 2 substantially contains a drive 7, a percussion-mechanism apparatus 8, a transmission apparatus 9 and a control apparatus 10. As indicated in FIG. 1, the drive 7 is connected to the percussion-mechanism apparatus 8 via the transmission apparatus 9 in such a way that a torque generated by the drive 7 can be transmitted to the percussion-mechanism apparatus 8. As a result of the torque transmitted from the drive 7 to the percussion-mechanism apparatus 8, the percussion-mechanism apparatus 8 can generate percussion pulses. As further indicated in FIG. 1, the percussion-mechanism apparatus 8 is connected to the tool-fitting apparatus 4 in such a way that the percussion pulses are transmitted to the tool 6 positioned in the tool-fitting apparatus 4.

The drive 7 is designed here as an electric motor, in particular as a brushless electric motor.

The tool housing 2 has a front end 2*a* and a rear end 2*b*. The tool-fitting apparatus 4 is positioned at the front end 2*a*, and the handle 3 is positioned at the rear end 2*b*.

As shown in FIG. 2, the tool-fitting apparatus 4 in turn substantially contains an actuating cap 11, an elongate basic body 12, a locking ring 13, first and second locking elements 14, 15 and a press-on element 16.

The actuating cap 11 is designed substantially as a conical or cone-shaped sleeve which contains a first end 11*a* and a second end 11*b*.

Figure 7B:
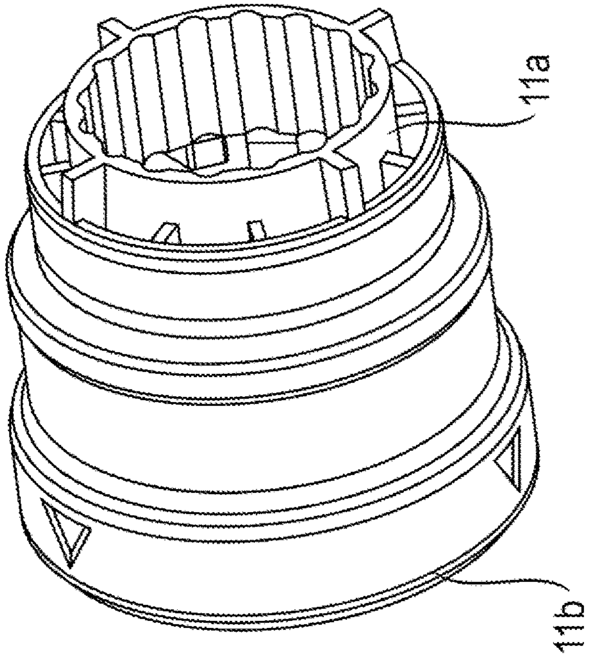
FIG. 7*b* shows a second perspective view of the actuating cap.
Figure 7A:
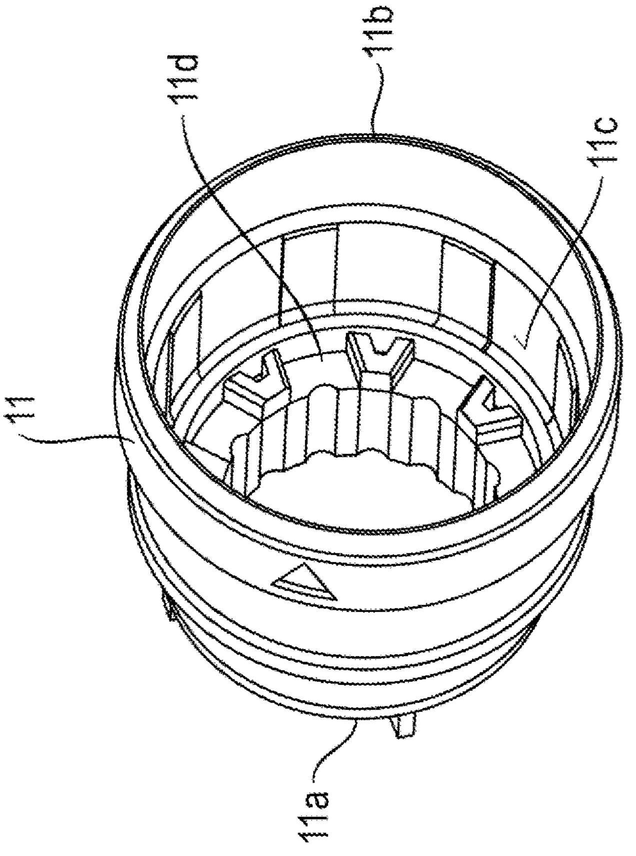
FIG. 7*a* shows a first perspective view of the actuating cap.
Figure 14B:
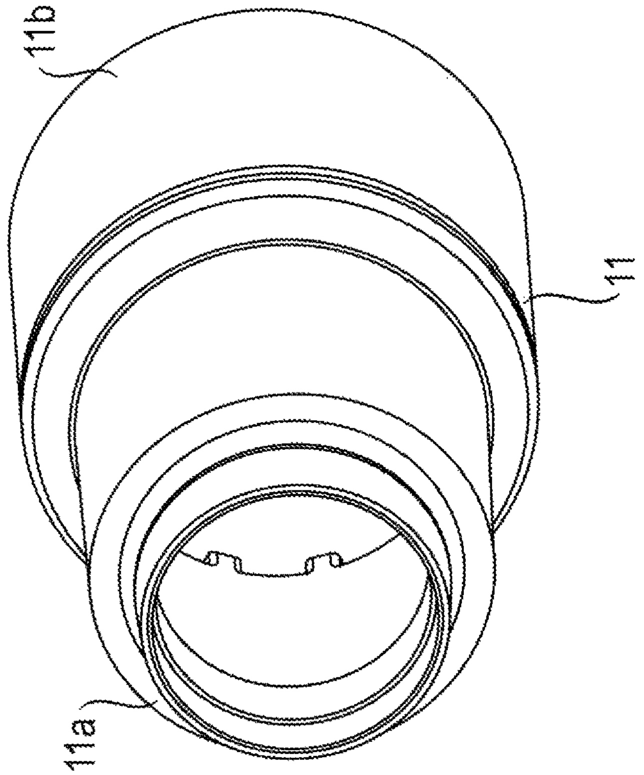
FIG. 14*b* shows a perspective rear view of the actuating cap according to the second embodiment.
Figure 14A:
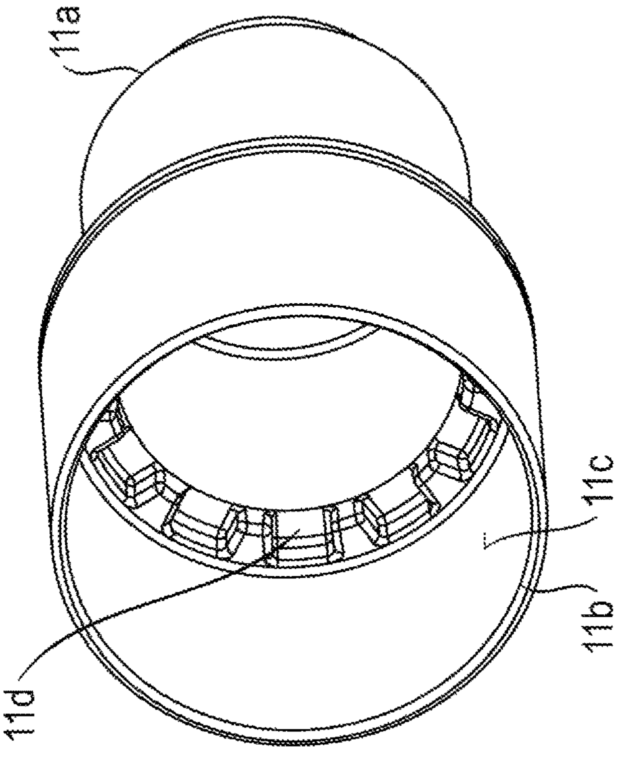
FIG. 14*a* shows a perspective front view of the actuating cap according to the second embodiment.

In FIGS. 7*a* and 7*b*, the actuating cap 11 is shown in a first embodiment. FIGS. 14*a* and 14*b* show the actuating cap 11 in a second embodiment.

The actuating cap 11 according to both the first and second embodiments has a step 11*d* on an inner lateral surface 11*c*. As will be described in detail later, the step 11*d* serves as a contact surface or support surface for the press-on element 16.

The elongate basic body 12 serves to receive a rear end 6*b* of the tool 6 configured as a chisel. As will be described in detail below, the basic body 12 additionally serves to receive the locking ring 13, the first and second locking elements 14, 15 and the press-on element 16 (see, e.g., FIG. 2). The basic body 12 is designed substantially in the form of a tube which has a first and second section 12*a*, 12*b* (see, e.g. FIGS. 9 and 17). Both the first section 12*a* and the second section 12*b* each contain first and second ends. The first section 12*a* has a smaller outside and inside diameter than the second section 12*b*. The first end of the first section 12*a* forms a front end of the basic body 12. The second end of the first section 12*a* is connected to the first end of the second section 12*b*. The second end of the second section 12*b* in turn forms the rear end of the basic body 12. First and second radial openings 17*a*, 17*b* are present on the first section 12*a* of the basic body 12 (see, e.g, FIG. 10). The first and second openings 17*a*, 17*b* are elongate in form and positioned opposite one another.

Figure 9:
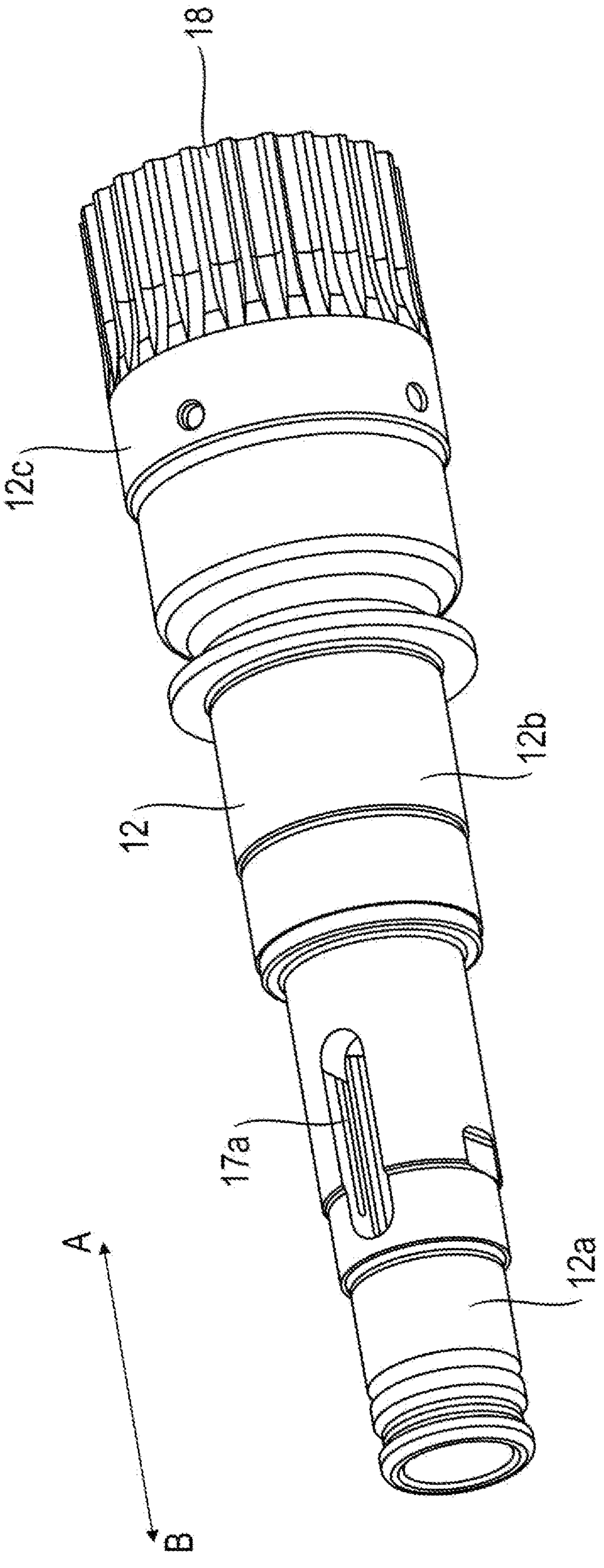
FIG. 9 shows a perspective front view of the basic body according to a first embodiment.
Figure 17:
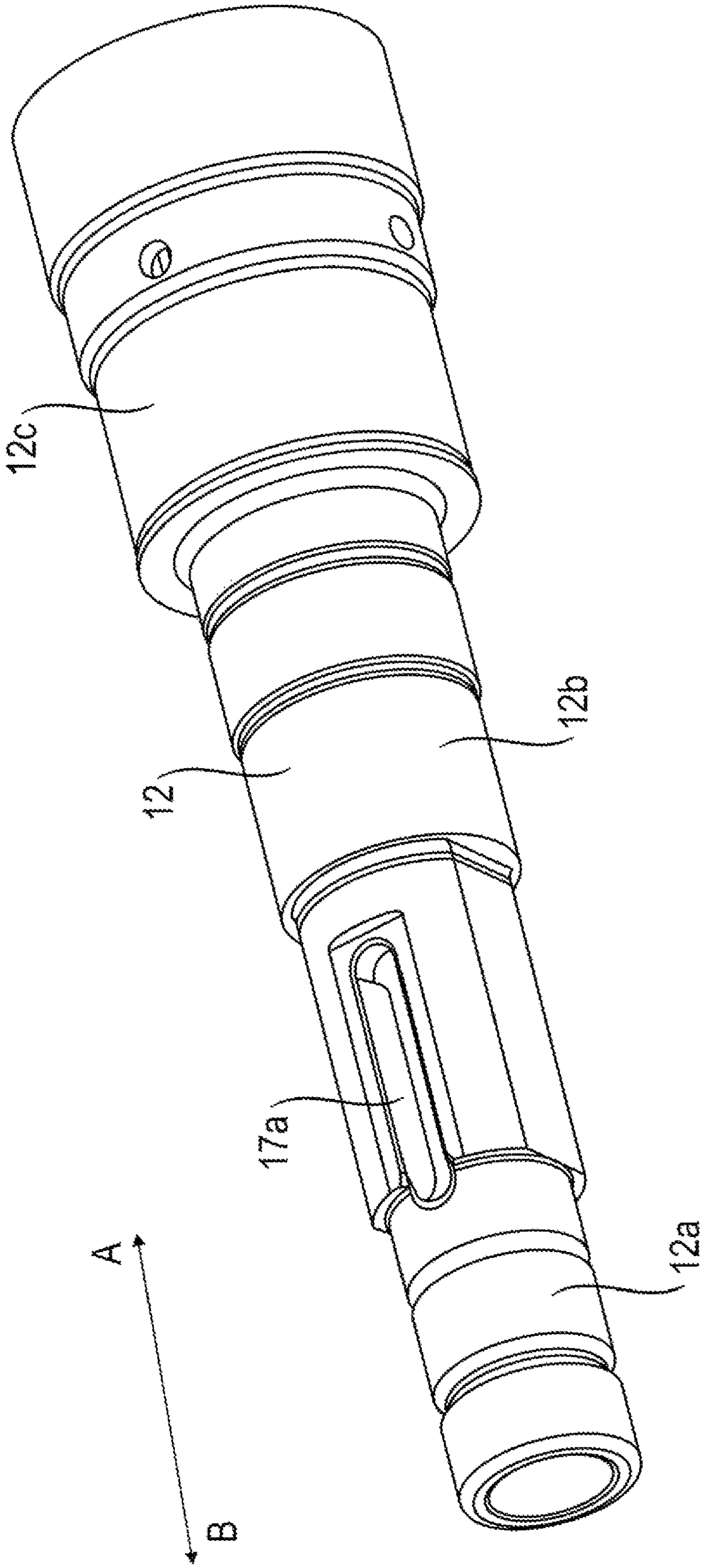
FIG. 17 shows a perspective front view of the basic body according to a second embodiment.
Figure 18:
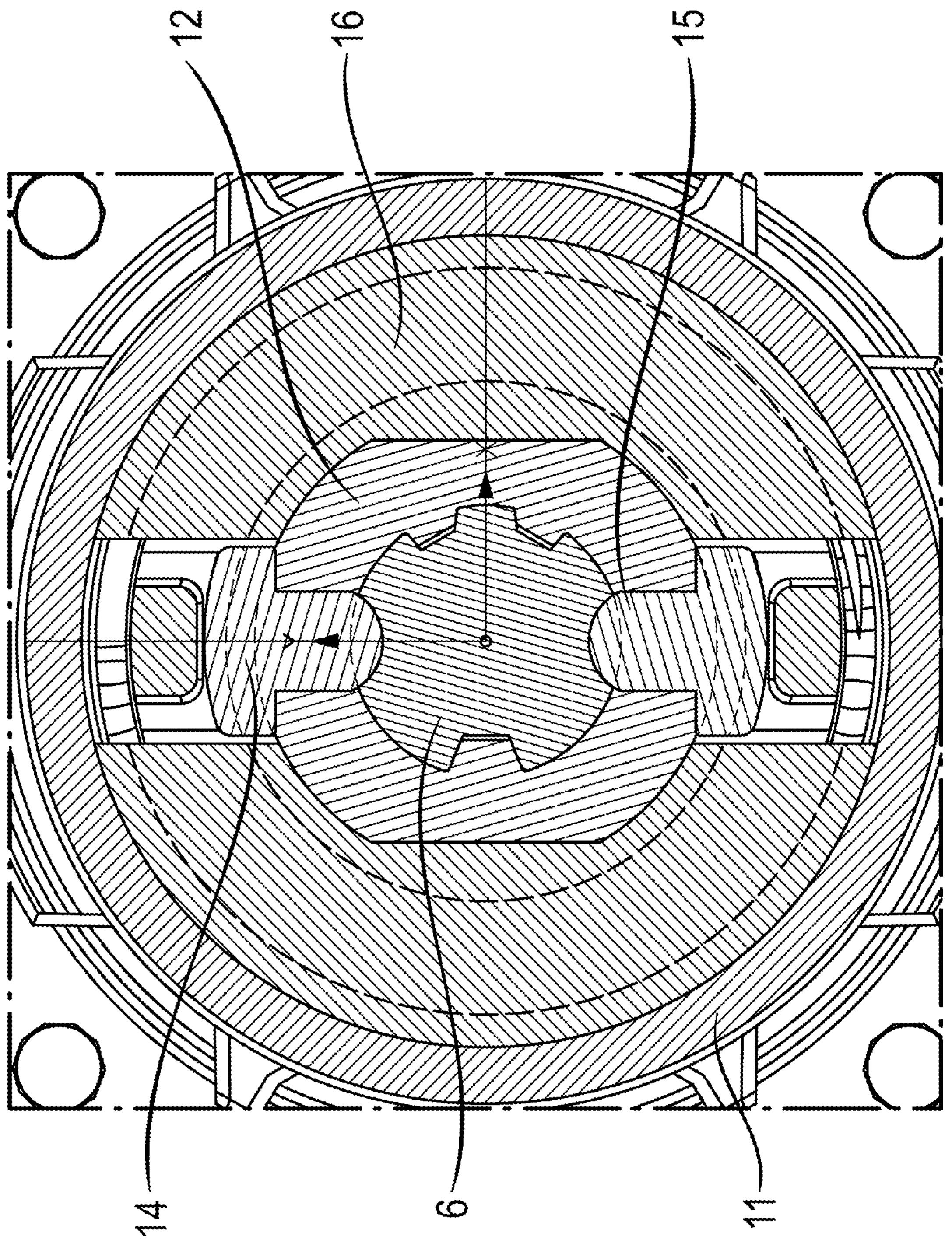
FIG. 18 shows a front sectional view of the actuating cap, the first and second locking elements, the basic body, the tool and the press-on element according to the second embodiment.

In FIG. 9, the basic body 12 is shown in a first embodiment. FIG. 17 shows the basic body 12 in a second embodiment. The basic body 12 according to the first and second embodiments differs substantially in that the basic body 12 of the FIG. 9 embodiment contains an annular toothing 18 at the rear end. The toothing 18 serves for the rotationally fixed connection of the basic body 12 to a housing of the percussion-mechanism apparatus 8.

The first and second locking elements 14, 15 substantially have a cuboidal basic body with a front end 19*a*, a rear end 19*b*, an upper end 19*c* and a lower end 19*d* (see, e.g., FIGS. 6, 10, 16*a*, 16*b* 23*a* and 23*b*). The locking elements 14, 15 serve for re-releasably connecting the basic body 12 to the rear end 6*b* of the tool 6 when the rear end 6*b* of the tool 6 is located in the tool-fitting apparatus 4.

Figure 6:
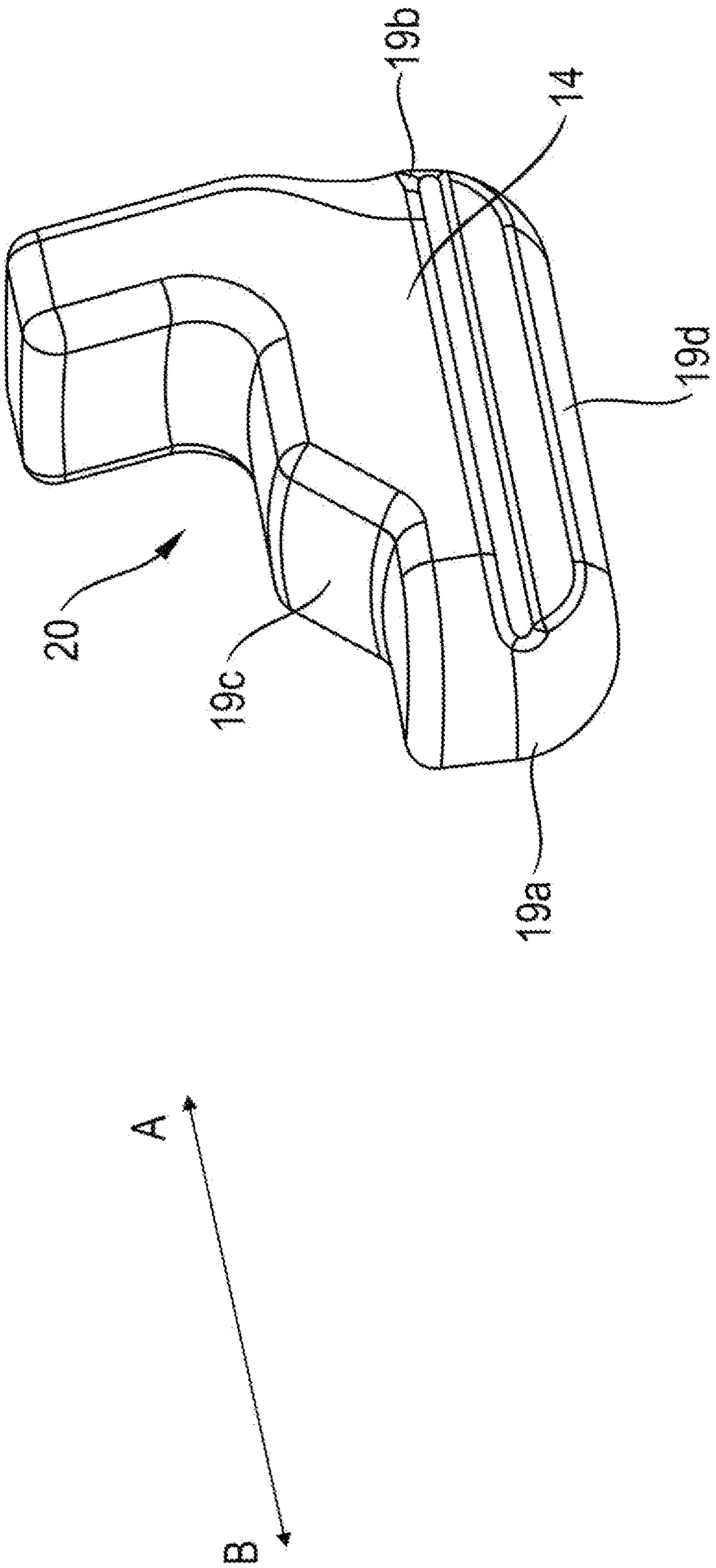
FIG. 6 shows a perspective view of the locking element according to a first embodiment.
Figure 16A:
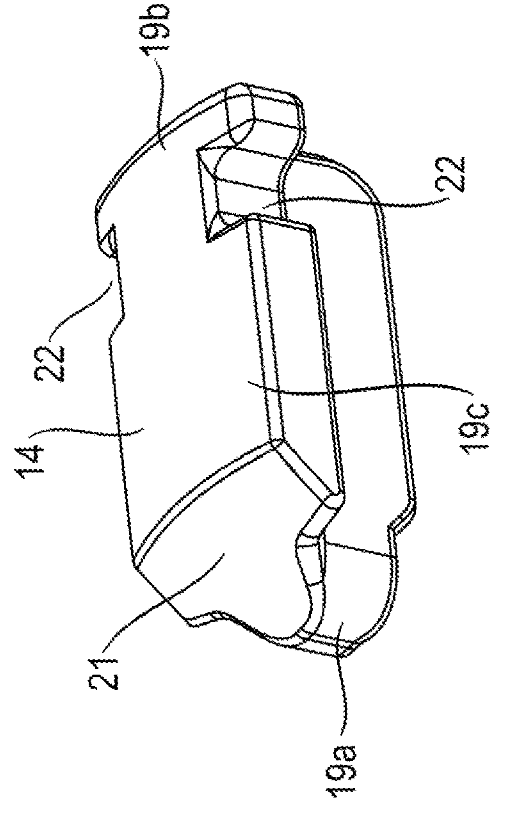
FIG. 16*a* shows a first perspective view of a locking element according to the second embodiment.
Figure 16B:
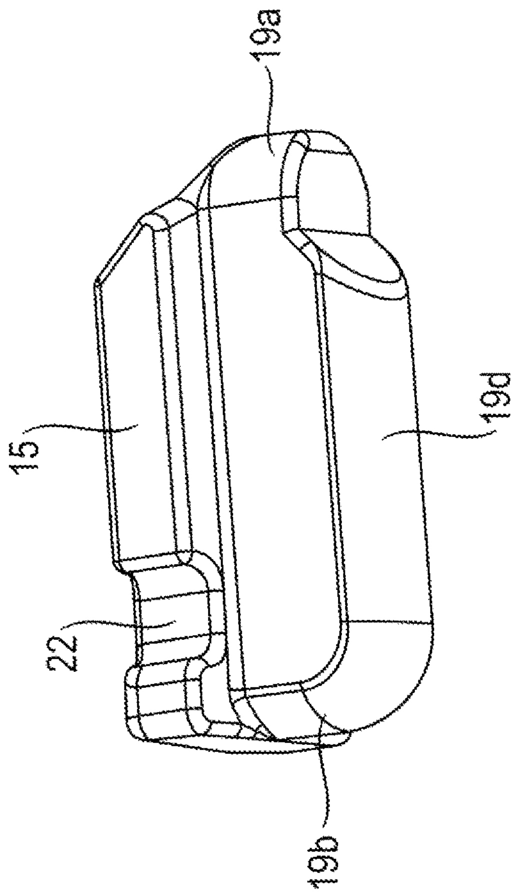
FIG. 16*b* shows a second perspective view of a locking element according to the second embodiment.
Figure 23B:
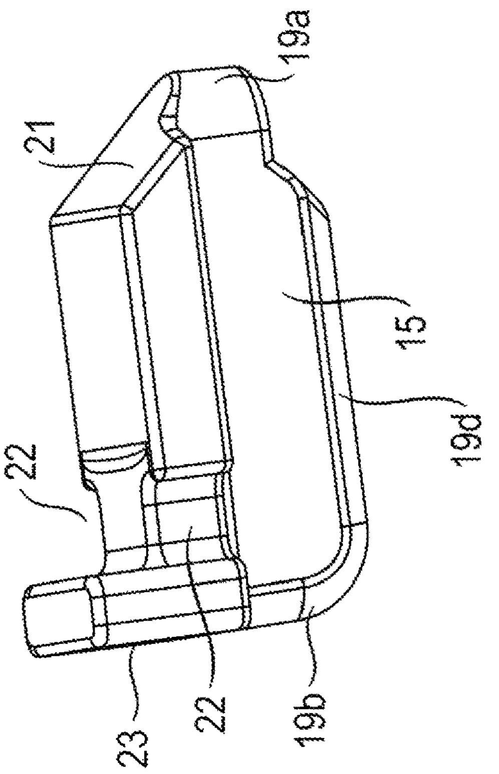
FIG. 23*b* shows a second perspective view of a locking element according to the third embodiment.
Figure 23A:
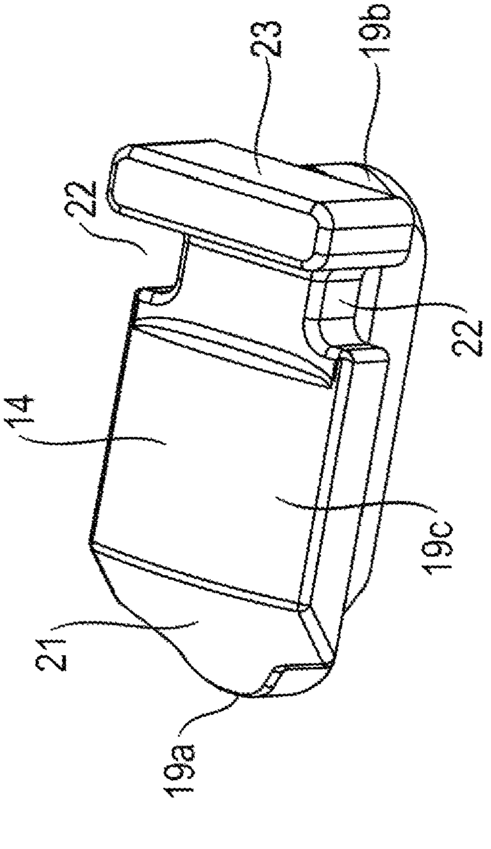
FIG. 23*a* shows a first perspective view of a locking element according to the third embodiment.
Figure 24A:
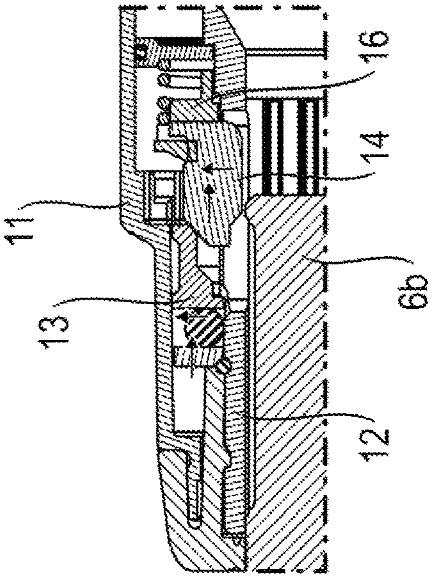
FIG. 24*a* shows a lateral sectional view of the basic body, the locking ring, the first and second locking elements and the press-on element according to the third embodiment with the locking elements in a first position.
Figure 24B:
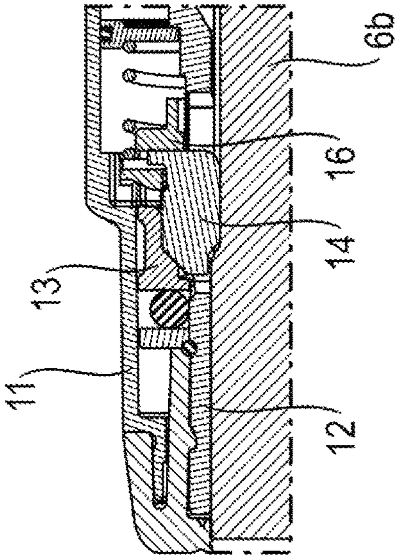
FIG. 24*b* shows a lateral sectional view of the basic body, the locking ring, the first and second locking elements and the press-on element according to the third embodiment with the locking elements in a second position.
Figure 24C:
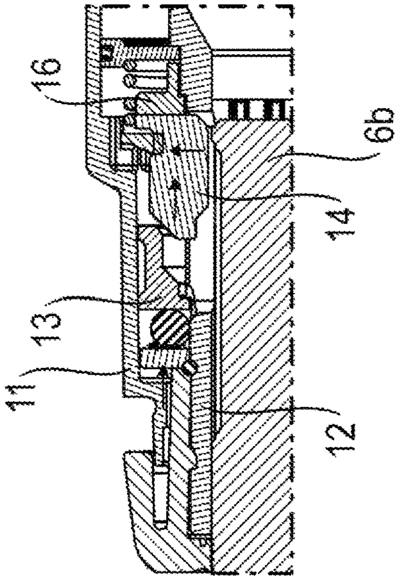
FIG. 24*c* shows a lateral sectional view of the basic body, the locking ring, the first and second locking elements and the press-on element according to the third embodiment with the locking elements in a third position.

In FIG. 6 there are shown the locking elements 14, 15 in a first embodiment. FIGS. 16*a* and 16*b* show the locking elements 14, 15 in a second embodiment. In FIGS. 23*a* and 23*b* there are illustrated the locking elements 14, 15 in a third embodiment.

The locking elements 14, 15 can also be referred to as pawls and serve to re-releasably connect the tool 6 to the basic body 12.

The locking elements 14, 15 shown in FIG. 6 contains three steps 20 rising in direction A at the upper end. The first and second locking elements 14, 15 are identical to one another.

The locking elements 14, 15 shown in FIGS. 16*a* and 16*b* according to the second embodiment have substantially a flat basic shape. At a front end 19*a*, the locking elements 14, 15 according to the second embodiment contain a flattened contact surface 21. At a rear end 19*b*, the locking elements 14, 15 each contain a depression 22 on a left and a right lateral surface. The depression 22 can also be referred to as a groove or cutout. As will be described in detail later, these depressions 22 serve to establish a re-releasable connection with the press-on element 16.

The locking elements 14, 15 shown in FIGS. 23*a* and 23*b* according to the third embodiment substantially correspond to the locking elements 14, 15 according to the second embodiment, since they likewise have a flat basic shape. At a front end 19*a*, the locking elements 14, 15 according to the third embodiment likewise contain a flattened contact surface 21. At a rear end 19*b*, the locking elements 14, 15 likewise each contain a depression 22 on a left and a right lateral surface. By contrast with the locking elements 14, 15 according to the second embodiment, the locking elements 14, 15 according to the third embodiment contain an elevation 23 which extends perpendicular to the longitudinal extent of the basic shape of the locking elements 14, 15. In addition to the depressions 22 on the right and left lateral surfaces, this elevation 23 serves for an improved connection of the locking elements 14, 15 to the press-on element 16.

The locking ring 13 is designed substantially as a sleeve and substantially serves to fix the first and second locking elements 14, 15 in a locking position in which the tool 6 is held by means of the locking elements 14, 15 in the basic body.

Figure 8:
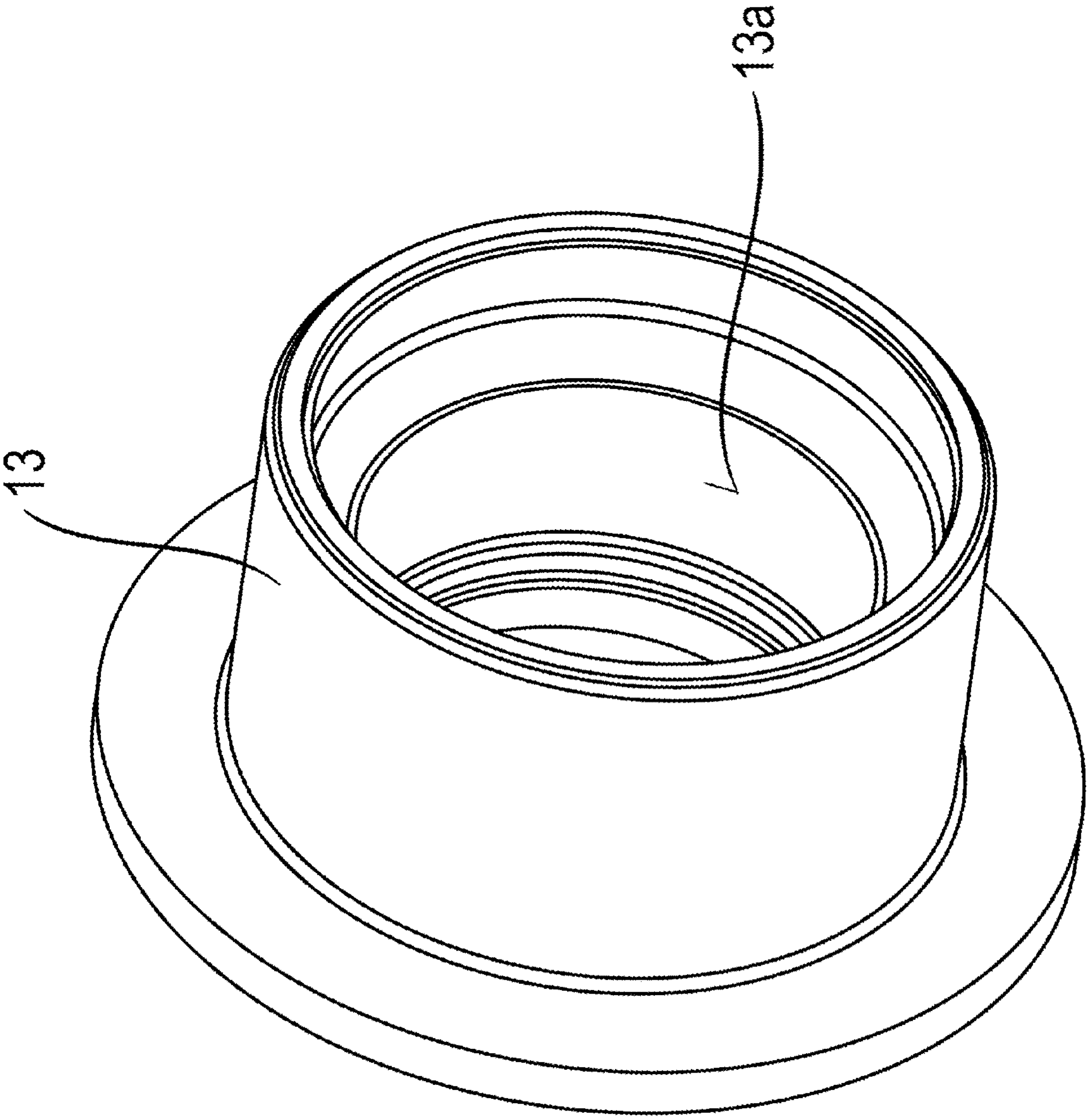
FIG. 8 shows a perspective rear view of the locking ring.

FIG. 8 shows the locking ring 13 in a first embodiment. The inner lateral surface 13*a* of the locking ring 13 according to the first embodiment is likewise designed in a stepped manner and corresponds to the upper end 19*c* of the first and second locking elements 14, 15 according to the first embodiment.

Figure 15B:
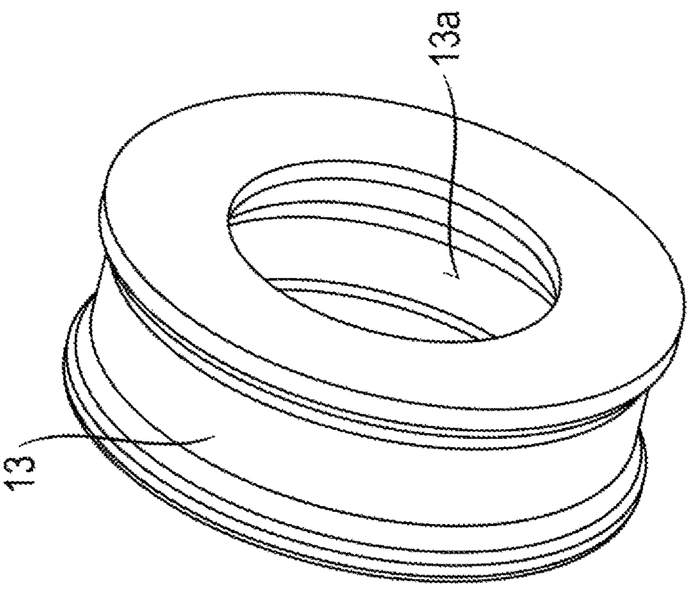
FIG. 15*b* shows a perspective rear view of the locking ring.
Figure 15A:
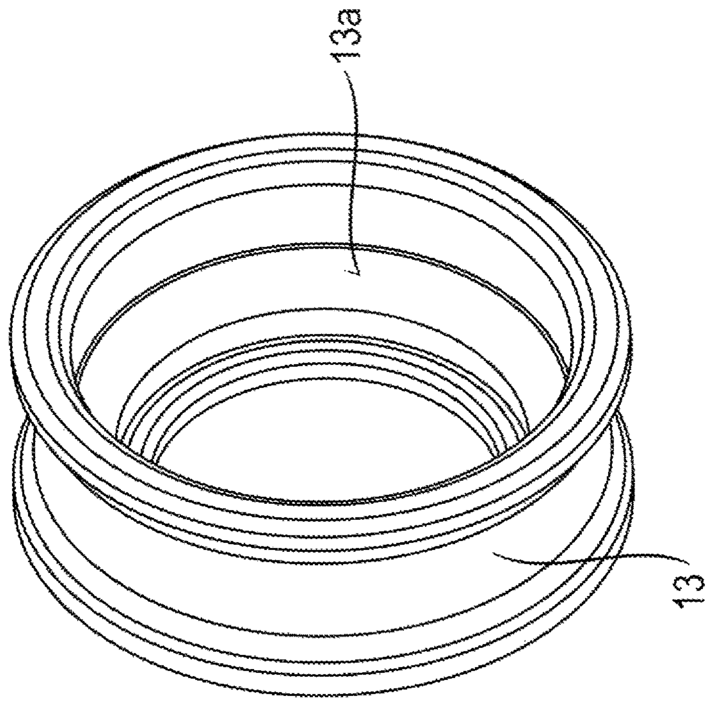
FIG. 15*a* shows a perspective front view of the locking ring.

In FIGS. 15*a* and 15*b*, the locking ring 13 is illustrated in a second embodiment. The locking ring 13 according to the second embodiment has a flattened plane on an inner lateral surface 13*a*. The angle of the flattened plane corresponds to the angle of the flattened contact surface 21 at the front end 19*a* of the locking elements 14, 15 according to the second embodiment.

Figure 4B:
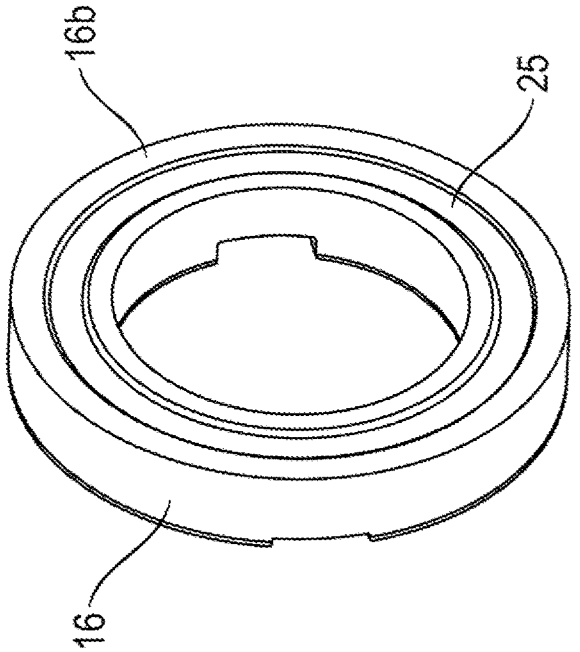
FIG. 4*b* shows a second perspective view of the press-on element according to the first embodiment.
Figure 4A:
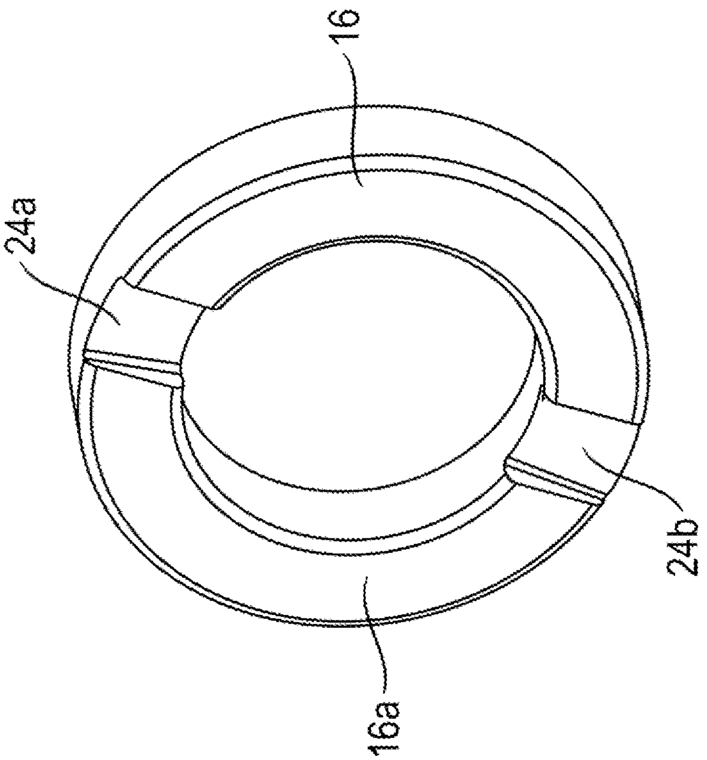
FIG. 4*a* shows a first perspective view of the press-on element according to a first embodiment.

In all of the embodiments, the press-on element 16 is designed substantially as a ring made of an elastic material (see, e.g, 4*a*, 4*b*, 13*a*, 13*b*, 19*a* and 19*b*). Here, the press-on element 16 designed as a ring is either completely or at least partially made of an elastic material. The elastic material may be an elastomer or rubber. The press-on element 16 shown in FIGS. 4*a* and 4*b* according to a first embodiment is ring-shaped in form and has a first and a second surface side 16*a*, 16*b*. On the first surface side 16*a*, a first and second cutout 24*a*, 24*b* are provided, which are positioned opposite one another and extend radially over the entire first surface side 16*a*. The cutouts 24*a*, 24*b* can also be referred to as a groove. An annular groove 25 is provided on the second surface side 16*b*.

Figure 11:
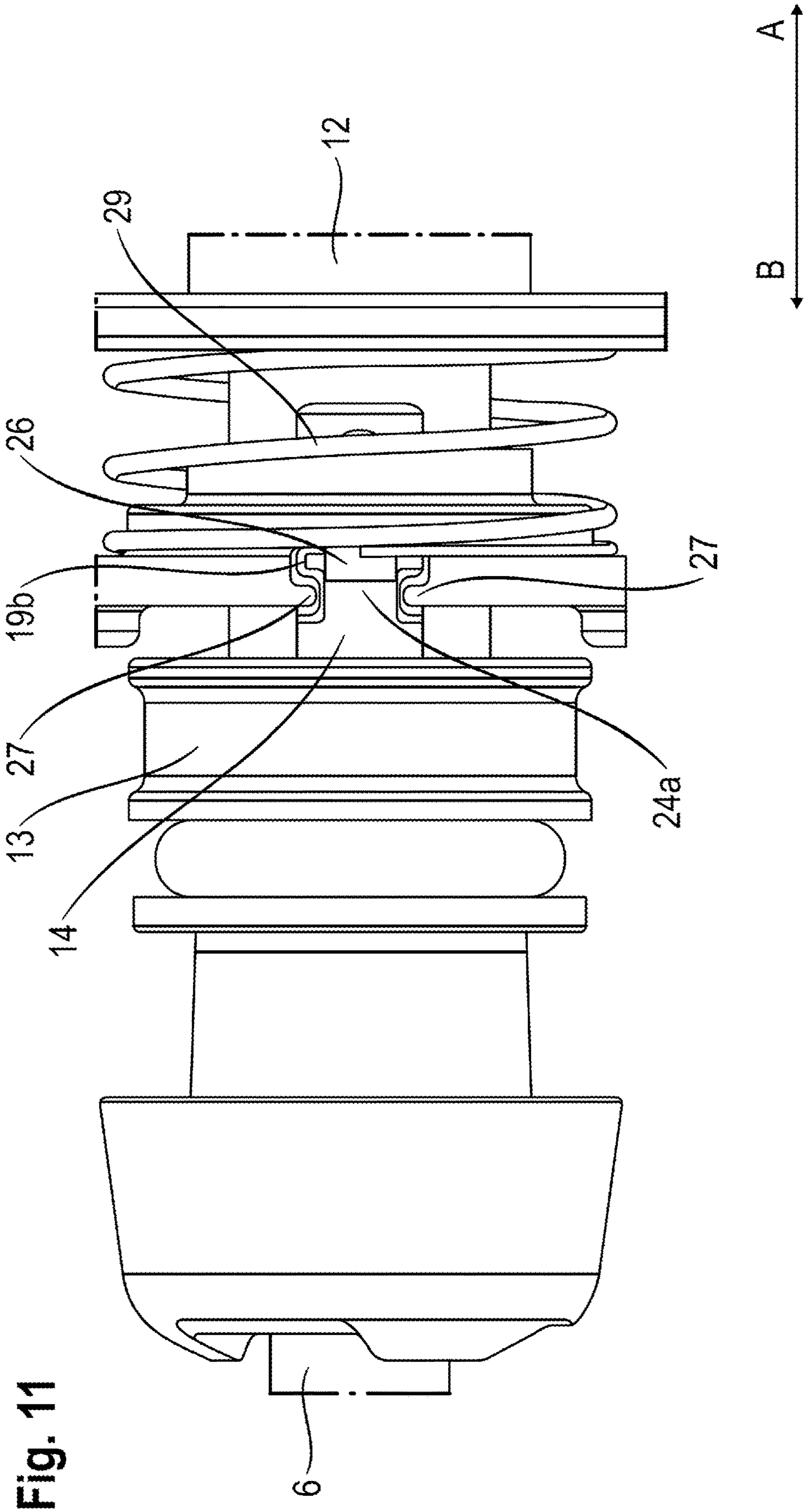
FIG. 11 shows a plan view of the basic body, the locking ring, the first locking element and the press-on element according to the second embodiment.
Figure 13B:
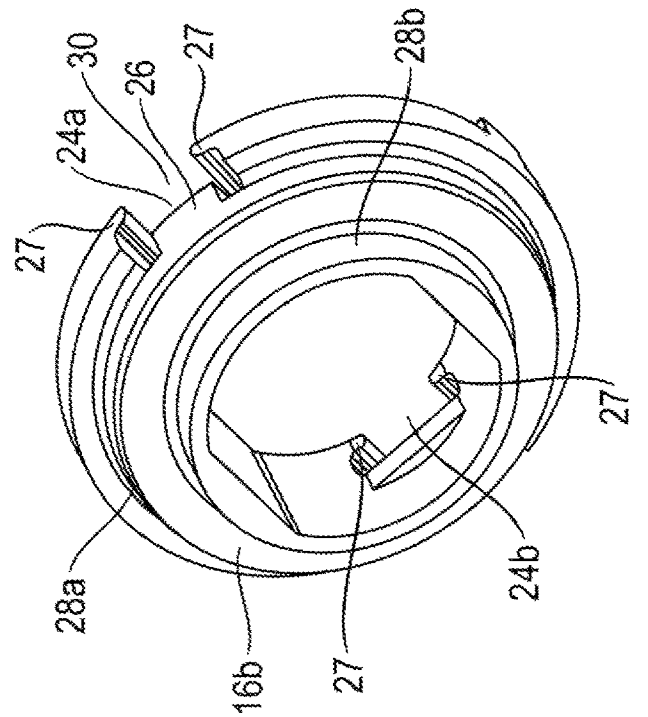
FIG. 13*b* shows a perspective rear view of the press-on element in a second embodiment.
Figure 13A:
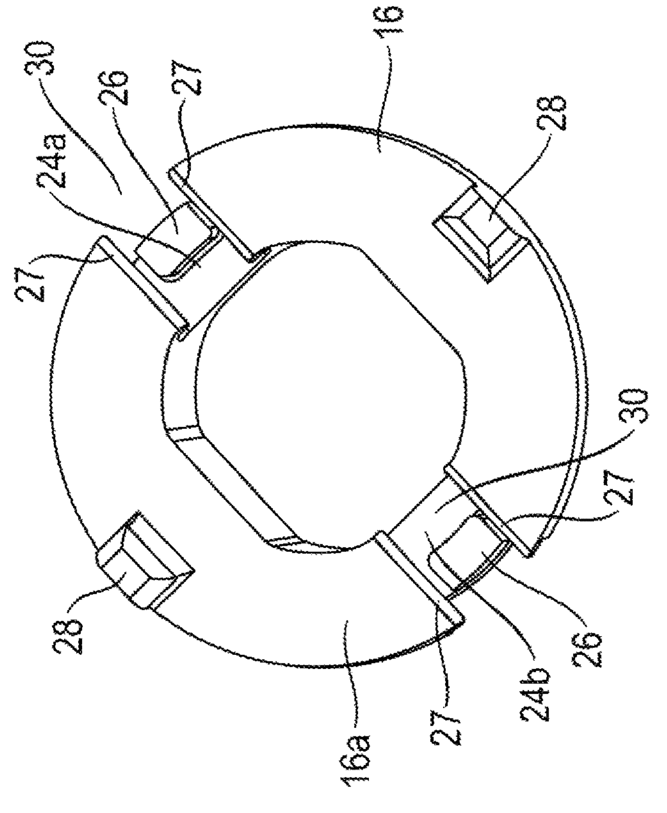
FIG. 13*a* shows a perspective front view of the press-on element in a second embodiment.

The press-on element 16 shown in FIGS. 13*a* and 13*b* according to the second embodiment is likewise ring-shaped in form and also contains a first and second surface side 16*a*, 16*b*. First and second cutouts 24*a*, 24*b* are provided opposite one another on the first surface side 16*a*. The first and second cutouts 24*a*, 24*b*, which can each also be referred to as a groove, extend in the radial direction. The cutouts 24*a*, 24*b* serve as receiving regions for the respective rear end 19*b* of the locking elements 14, 15. An elevation 26 is present in each of the first and second cutouts 24*a*, 24*b*. The elevation 26 serves as a spring device to press the locking elements 14, 15 in direction B when the rear end 19*c* of the locking elements 14, 15 is located in the cutouts 24*a*, 24*b* of the press-on element 16. As shown in FIGS. 11 and 13*b*, the elevation 26 in the first and second cutouts 24*a*, 24*b* extends in the axial direction B only up to half the height of the cutouts 24*a*, 24*b*. In other words: The elevation 26 is half as high as the cutouts 24*a*, 24*b*. As likewise shown in FIGS. 11, 13*a* and 13*b*, a lip 27 in each case protrudes from the left and right side of the cutouts 24*a*, 24*b* over the cutouts 24*a*, 24*b*. The lips 27 can be referred to as lip elements or as a holding device. The length of the lips 27 is chosen here so that an opening is created between the free ends of the lips 27. As described in detail below, the lips 27 serve as a holding device for the locking elements 14, 15 on the press-on element 16.

Furthermore, two connecting elements 28 in the form of elevations are present on the first surface side. The connecting elements 28 are arranged opposite one another and positioned offset by 90° to the two cutouts 24*a*, 24*b*. The connecting elements 28 serve to rotationally fixedly connect the press-on element 16 to the actuating cap 11. On the second surface side 16*b* of the press-on element 16, two annular steps 28*a*, 28*b* are provided.

Figure 19B:
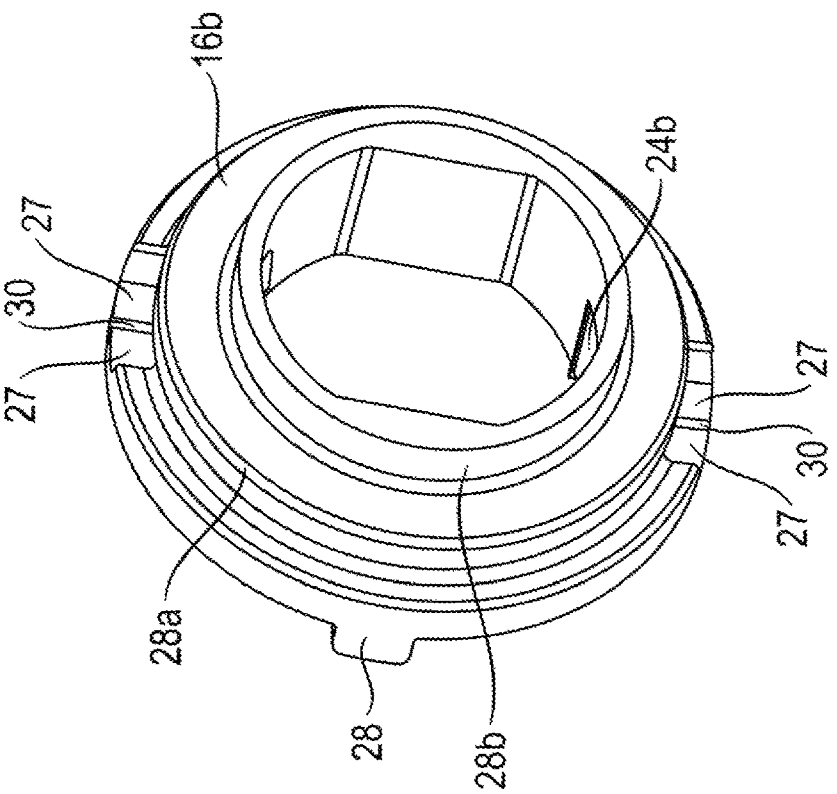
FIG. 19*b* shows a perspective rear view of the press-on element according to a third embodiment.
Figure 19A:
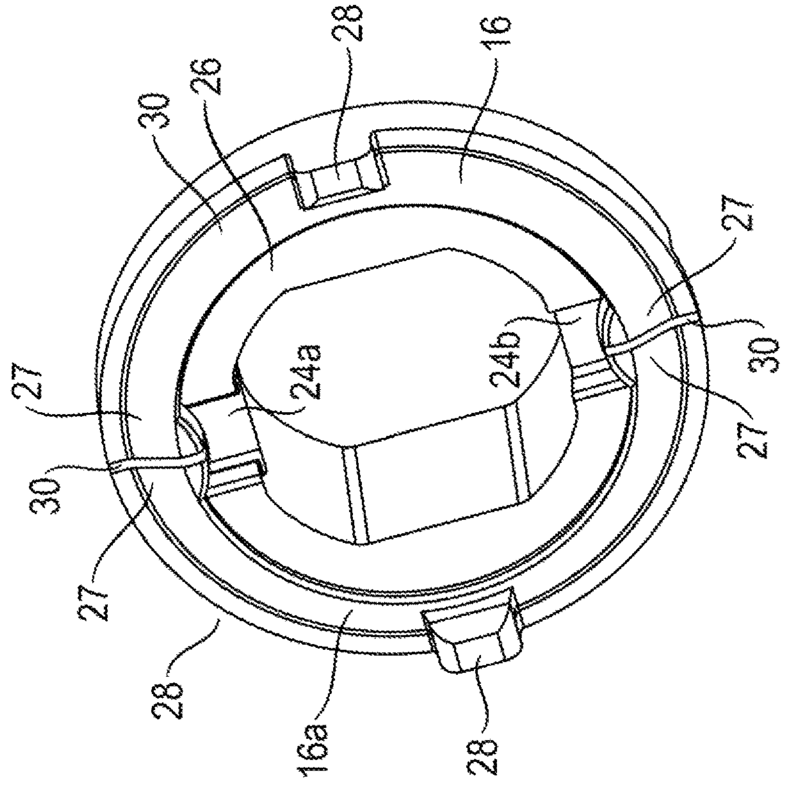
FIG. 19*a* shows a perspective front view of the press-on element according to a third embodiment.

The press-on element 16 shown in FIGS. 19*a* and 19*b* according to the third embodiment is likewise ring-shaped in form and also contains a first and a second surface side 16*a*, 16*b*. The design of the press-on element 16 according to the third embodiment is substantially identical to the press-on element 16 according to the second embodiment. Unlike the second embodiment, in the press-on element 16 according to the third embodiment, the lips 27 of the two cutouts 24*a*, 24*b* are made longer, with the result that the respective free ends of the lips 27 almost close the cutouts 24*a*, 24*b*, and almost no opening between the free ends of the lips 27 are provided over the respective cutouts 24*a*, 24*b*. Moreover, according to the third embodiment, the press-on element 16 does not contain any elevation 26 in the two cutouts 24*a*, 24*b*.

Figure 3:
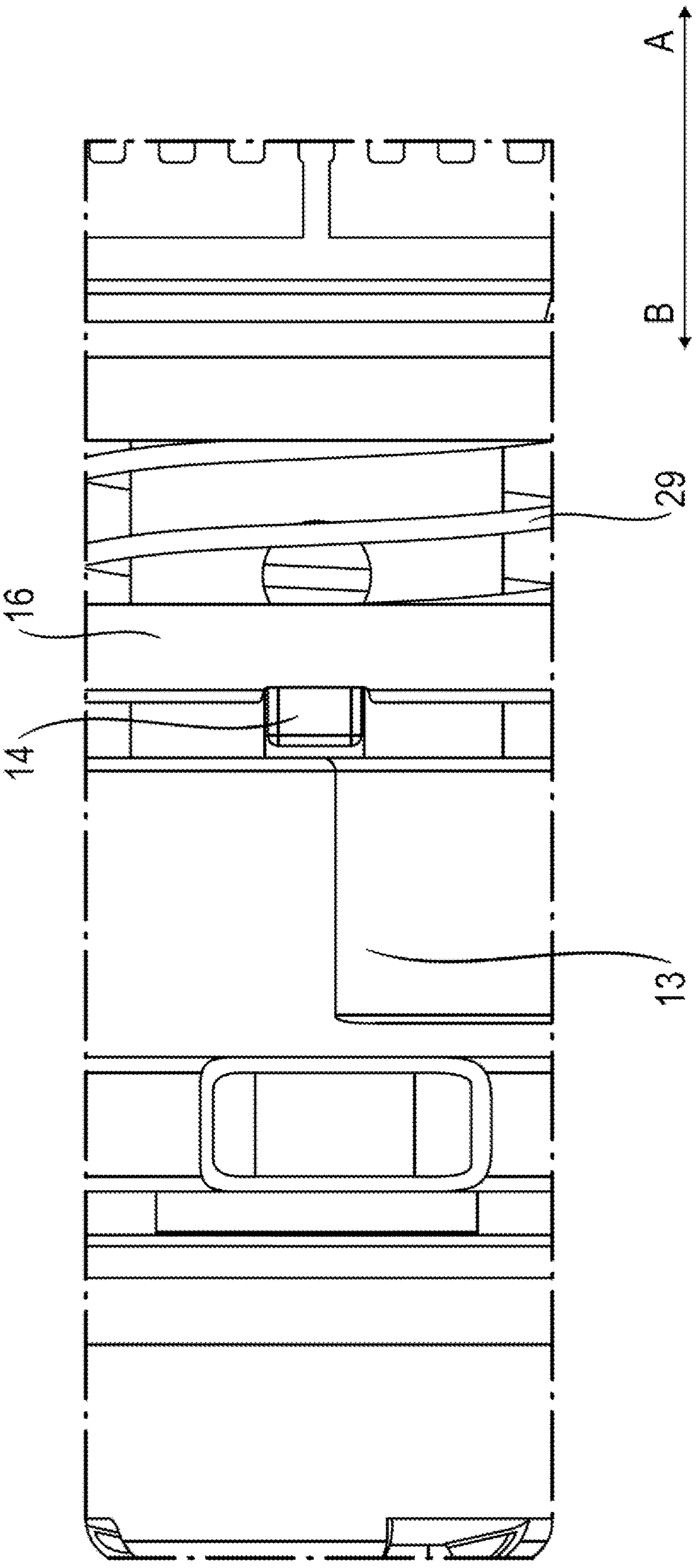
FIG. 3 shows a detail view of the basic body, the locking element, a locking ring and the press-on element.
Figure 5:
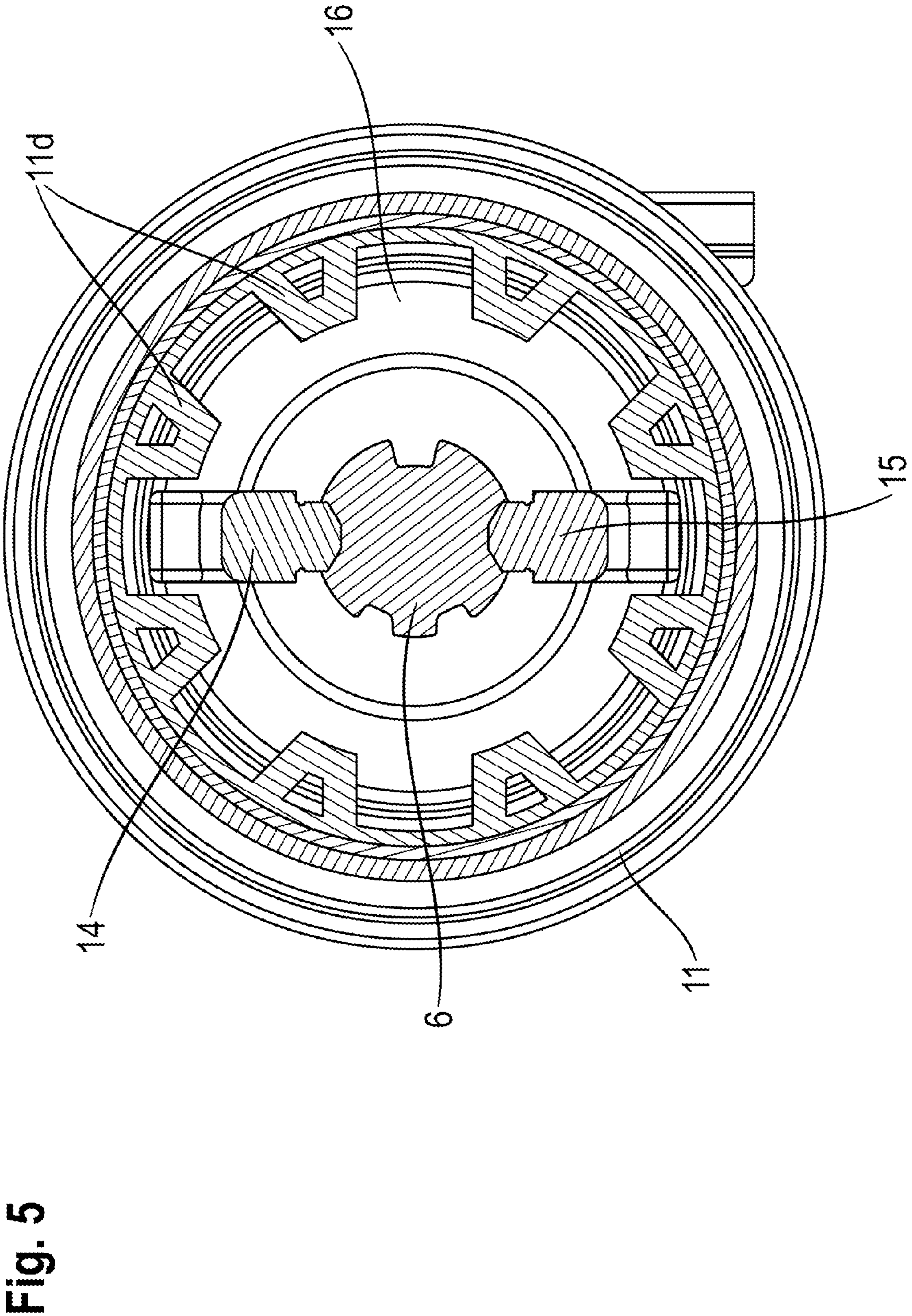
FIG. 5 shows a front sectional view of the actuating cap, the first and second locking elements, the basic body, the tool and the press-on element according to the first embodiment.

In FIGS. 2, 3 and 5, the tool fitting 4 or a front portion of the power tool 1 according to a first embodiment is shown in an assembled state. For this purpose, the first locking element 14 is positioned into the first radial opening 17*a* of the basic body 12, and the second locking element 15 is positioned into the second radial opening 17*b* of the basic body 12. As will be described in detail below, the two locking elements 14, 15 can each here be positioned in a locking position or in a release position.

The locking ring 13 is positioned over the basic body 12 and is arranged in direction B behind the locking elements 14, 15. As can be seen in FIG. 2, the inner lateral surface 13*a* of the locking ring 13 according to the first embodiment is designed to be step-shaped, with the result that it corresponds to the step-shaped upper end 19*c* of the locking elements 14, 15. In other words: the upper end 19*c* of the locking elements 14, 15 matches, in its configuration, the inner lateral surface 13*a* of the locking ring 13.

Furthermore, the press-on element 16 is also positioned over the basic body 12. The press-on element 16 is here arranged in direction B in front of the locking elements 14, 15. As can be seen in FIGS. 2 and 3, the rear end 19*c* of the respective first and second locking elements 14, 15 lies in the cutouts 24*a*, 24*b* of the press-on element 16. As can likewise be seen in FIGS. 2 and 3, a helical spring 29 is positioned in direction B behind the press-on element 16. The helical spring 29 can also be referred to as a spring or spring element. The helical spring 29 presses, in direction B, onto the press-on element 16. As a result, the press-on element 16 is pressed onto the locking elements 14, 15.

The actuating cap 11 according to the first embodiment is likewise arranged over the basic body 12. As shown in FIG. 2, the actuating cap 11 is of conical design and has a step 11*d* in the inner lateral surface 11*c*, cf. FIG. 7*a*. The actuating cap 11 is positioned such that a front portion 11*a* of the actuating cap lies between the locking ring 13 and the press-on element 16. The step 11*d* lies against the rear end 19*c* of the respective locking elements 14, 15.

FIG. 2 shows the first and second locking elements 14, 15 in the locking position when the rear end 6*b* of the tool 6 designed as a chisel is to be held in the tool-fitting apparatus 4. When the actuating cap 11 is pressed in direction A, the step 11*d* on the inner side 11*c* of the actuating cap 11 presses the first and second locking elements 14, 15 and the press-on element 16 against the spring force of the helical spring 29 in direction A. By virtue of the fact that the two openings 17*a*, 17*b* on the basic body 12 are designed as oblong holes, the locking elements 14, 15 can be displaced in the axial direction A or B without the locking elements 14, 15 moving in the radial direction. When the locking elements 14, 15 are no longer in engagement with the locking ring 13, the locking elements 14, 15 can finally move in the radial direction. When the two locking elements 14, 15 have moved in the radial direction, the two locking elements 14, 15 are no longer in the locking position, but in the release position. In the release position, the rear end 6*b* of the tool 6 designed as a chisel is no longer held in the tool-fitting apparatus 4 by the locking elements 14, 15, and the tool 6 can be removed from the tool-fitting apparatus 4 in direction B.

In FIGS. 10, 11, 12*a*, 12*b* and 12*c*, the tool-fitting apparatus 4 or a front portion of the power tool 1 according to a second embodiment is shown in an assembled state. The tool-fitting apparatus 4 or the front portion of the power tool 1 according to the second embodiment substantially corresponds to the tool-fitting apparatus 4 or to the front portion of the power tool 1 according to the first embodiment.

Figure 10:
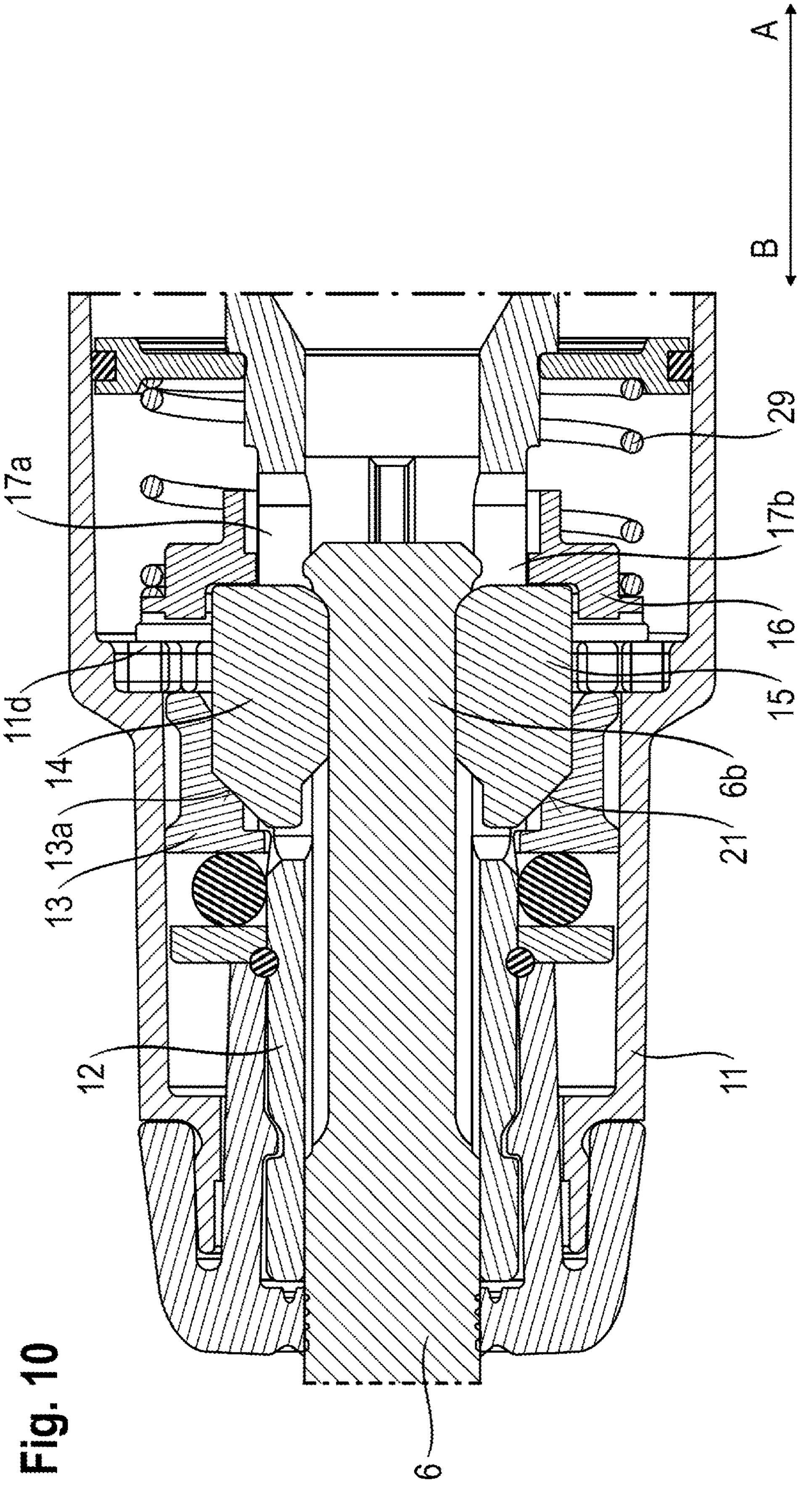
FIG. 10 shows a lateral sectional view of the actuating cap, the first and second locking elements, the basic body, the tool and the press-on element according to a second embodiment.
Figure 12A:
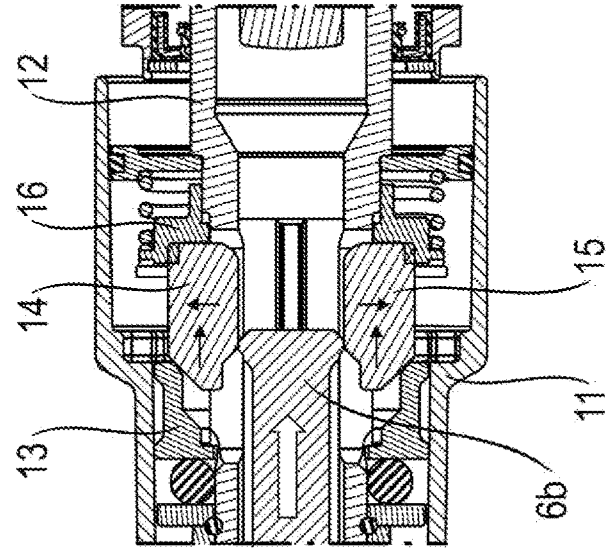
FIG. 12*a* shows a lateral sectional view of the basic body, the locking ring, the first and second locking elements and the press-on element according to the second embodiment with the locking elements in a first position.
Figure 12B:
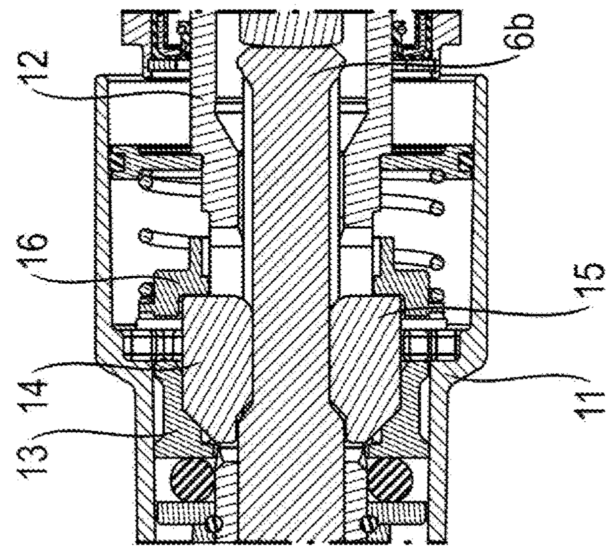
FIG. 12*b* shows a lateral sectional view of the basic body, the locking ring, the first and second locking elements and the press-on element according to the second embodiment with the locking elements in a second position.
Figure 12C:
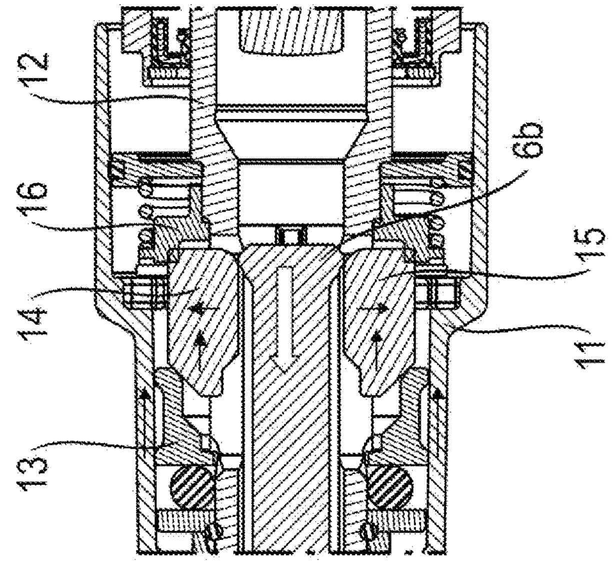
FIG. 12*c* shows a lateral sectional view of the basic body, the locking ring, the first and second locking elements and the press-on element according to the second embodiment with the locking elements in a third position.

FIGS. 10, 11 and 12*b* show the first and second locking elements 14, 15 in the locking position when the rear end 6*b* of the tool 6 designed as a chisel is to be held in the tool-fitting apparatus 4. Here, both the first and the second locking elements 14, 15 are positioned in such a way that the flattened contact surface 21 at the front end 19*a* of the locking elements 14, 15 lies against the flattened plane on the inner lateral surface 13*a* of the locking ring 13. The spring 29 presses the press-on element 16, in direction B, onto the locking elements 14, 15 and thus the locking elements 14, 15 against the locking ring 13. When the actuating cap 11 is pushed in direction A, the step 11*d* on the inner lateral surface 11*c* of the actuating cap 11 as a contact surface presses onto the press-on element 16 and presses the press-on element 16 against the spring force of the spring 29 in direction A. As can be seen in FIG. 11, the rear end 19*b* of the locking elements 14, 15 is positioned in the cutouts 24*a*, 24*b* of the press-on element 16 (according to the second embodiment) in such a way that the lips 27 at the cutouts 24*a*, 24*b* each engage in one of the depressions 22 on the left and right lateral surfaces of the locking elements 14, 15. This creates a form-fitting connection between the press-on element 16 and the locking elements 14, 15. Here, the material of the press-on element 16 is to be selected so that, on the one hand, the lips 27 are at least so flexible or movable that the rear end 19*b* of the locking elements 14, 15 can be brought past the lips 27 into the cutouts 24*a*, 24*b* of the press-on element 16. On the other hand, the material must be selected so that the lips 27 offer at least such resistance that the rear end 19*b* of the locking elements 14, 15 can be pulled only with a relatively high expenditure of force past the two lips 27 again and out of the cutouts 24*a*, 24*b* of the press-on element 16. When the press-on element 16 is pressed in direction A, the press-on element 16 can likewise pull the first and second locking elements 24*a*, 24*b* in direction A. When the first and second locking elements 14, 15 move in direction A, the two locking elements 14, 15 are no longer in engagement with the locking ring 13, with the result that the locking elements 14, 15 can move in the radial direction from the rear end 6*b* of the plugged-in tool 6, cf. FIG. 12*c*. When the two locking elements 14, 15 have moved in the radial direction, the two locking elements 14, 15 are located in the release position, with the result that the tool 6 can be removed from the tool-fitting apparatus 4.

In FIGS. 20, 21, 22, 24*a*, 24*b* and 24*c*, the tool-fitting apparatus 4 or a front portion of the power tool 1 according to a third embodiment is shown in an assembled state. The tool-fitting apparatus 4 or the front portion of the power tool 1 according to the third embodiment corresponds substantially to the tool-fitting apparatus 4 or the front portion of the power tool 1 according to the second embodiment. The mode of operation to move the locking elements 14, 15 from the locking position into the release position is identical in both of the tool-fitting apparatuses 4 according to the second and third embodiments.

Figure 20:
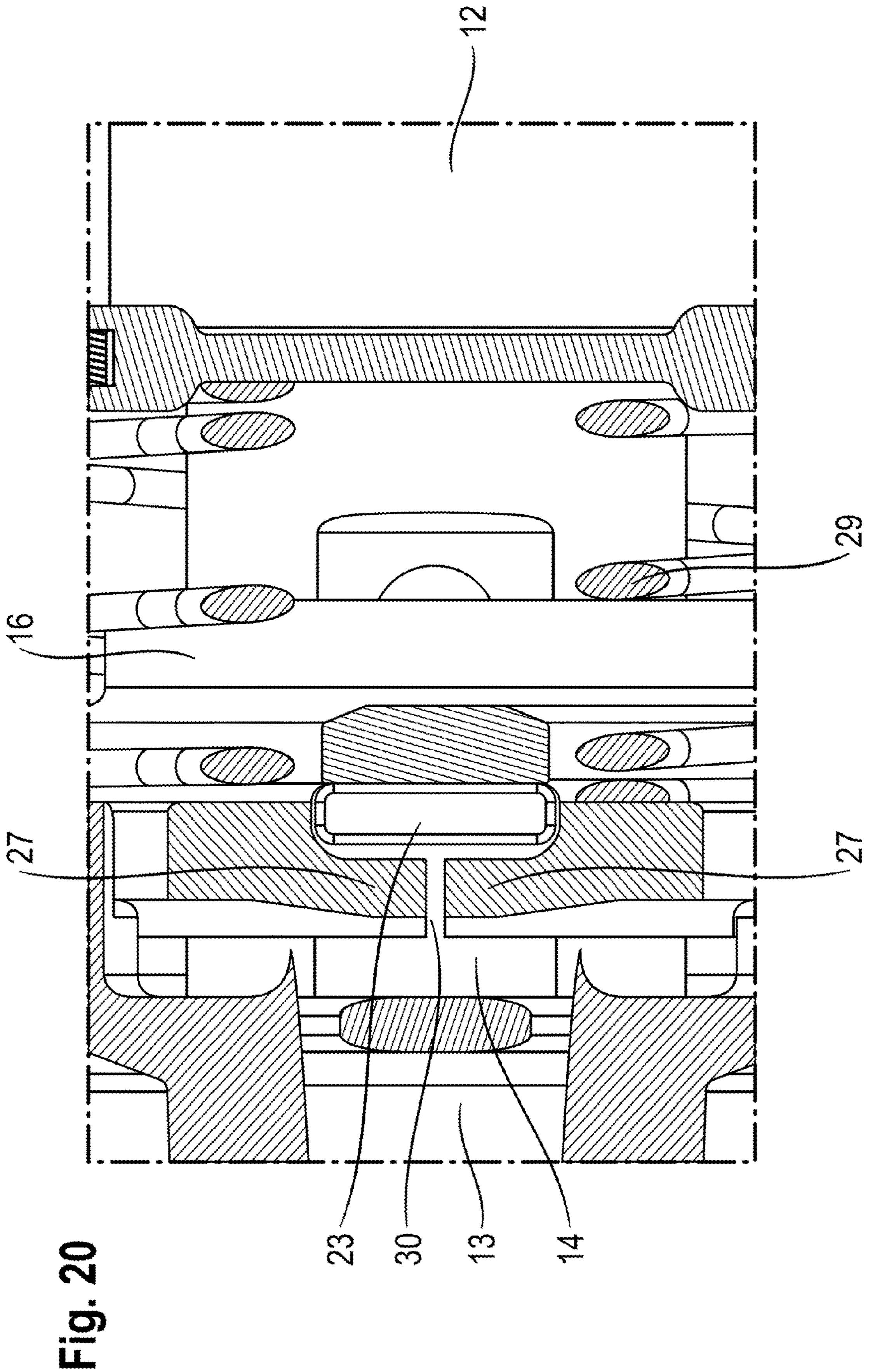
FIG. 20 shows a plan view of the basic body, the first locking element, the locking ring, the press-on element according to the third embodiment.
Figure 21:
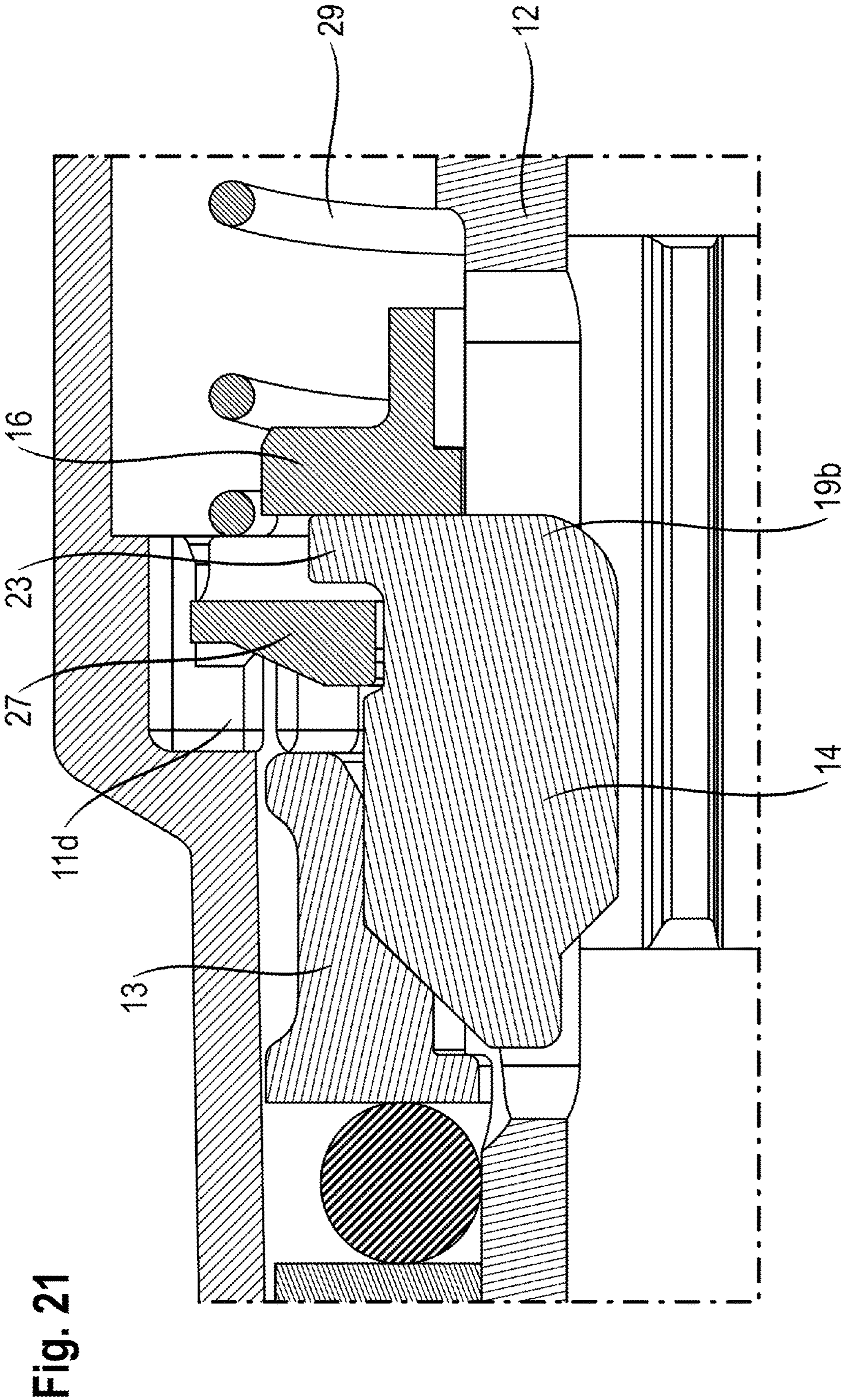
FIG. 21 shows a sectional view of the basic body, the first locking element, the locking ring and the press-on element according to the third embodiment.
Figure 22:
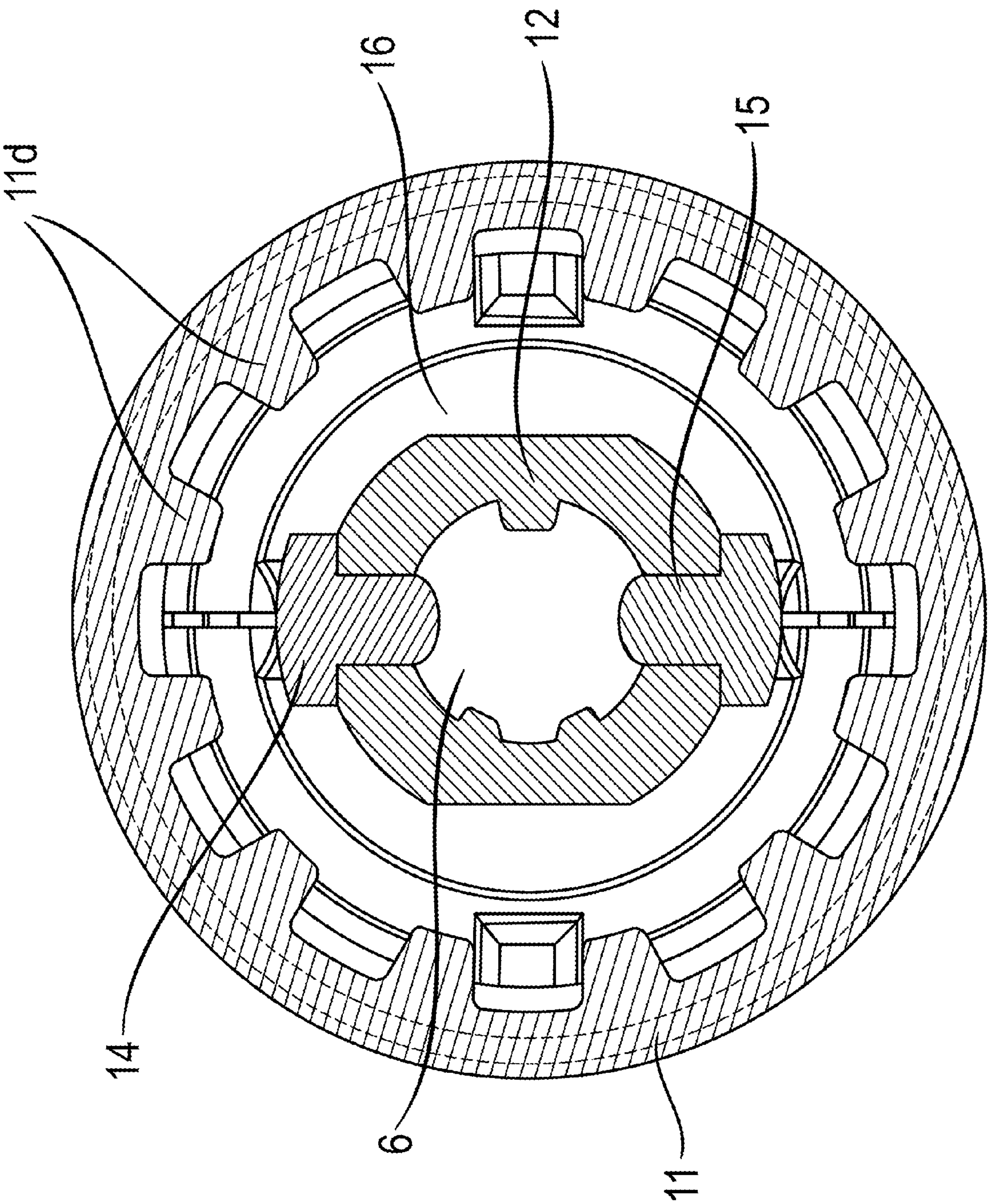
FIG. 22 shows a front sectional view of the actuating cap, the first and second locking elements, the basic body, the tool and the press-on element according to the third embodiment.

As already described above, the first and second locking elements 14, 15 according to the third embodiment have an elevation 23 at the rear end 19*b*. This elevation 23 serves to ensure an improved attachment or better form-fitting connection of the locking elements 14, 15 to the press-on element 16. As can be seen in FIGS. 20 and 21, the upper or free end of the elevation 23 protrudes at the rear end 19*b* of the locking elements 14, 15 in the radial direction in the cutouts 24*a*, 24*b* of the press-on element 16. As a result, a larger proportion of the rear end 19*b* of the locking elements 14, 15 is located in the cutouts 24*a*, 24*b* of the press-on element 16, with the result that a correspondingly higher expenditure of force is necessary in order to pull the rear end 19*b* of the locking elements 14, 15 past the lips 27 and out of the cutouts 24*a*, 24*b* of the press-on element 16. The form-fitting connection between the locking elements 14, 15 and the press-on element 16 is thus improved.

The invention claimed is:

1. A power tool containing a percussion-mechanism apparatus for generating percussion pulses on a tool, the power tool comprising:

a basic body for receiving a rear end of the tool;

at least one first and second locking element, each arranged lying in radial openings of the basic body in a reversible manner in a locking position or release position, wherein, in the locking position, the rear end of the tool is held in the basic body and, in the release position, the rear end of the tool is removable from the basic body;

a locking ring for holding the at least first and second locking elements in the locking position; and a press-on element for guiding the at least first and second locking elements in a first axial direction and a second axial direction, the press-on element including an elastic material, wherein the elastic material is an elastomer or rubber;

wherein the press-on element contains at least one first receiving region for at least partially receiving the at least first and second locking elements; wherein the press-on element is designed substantially as a ring wherein the ring has a first and a second surface side and wherein on the first surface side a first and second cutout are provided positioned opposite one another.

2. The power tool as recited in claim 1 wherein the press-on element contains at least one connector for the rotationally fixed connection of the press-on element to an actuating cap.

3. The power tool as recited in claim 1 wherein the at least one receiving region of the press-on element contains a holding device for re-releasably holding the at least first and second locking elements in the receiving region.

4. The power tool as recited in claim 3 wherein the holding device is designed in the form of a first and second elastically deformable lip element, wherein respective freely movable ends of the first and second lip elements are aligned with one another so that, through an opening between the first and second lip elements, the at least first and second locking elements are at least partially receivable in the at least one receiving region.

5. The power tool as recited in claim 1 wherein the at least one receiving region of the press-on element contains a spring for exerting a force in the first axial direction on the at least first and second locking elements.

6. The power tool as recited in claim 5 wherein the spring is designed in the form of an elastically deformable elevation in the first axial direction.

7. A rotary hammer or combination hammer comprising the power tool as recited in claim 1.

8. The power tool as recited in claim 1 wherein the first and second cutouts extend radially over an entirety of the first surface side.

9. The power tool as recited in claim 1 wherein an annular groove is provided on the second surface side.

10. The power tool as recited in claim 1 wherein wherein an elevation is present in each of the first and second cutouts.

11. The power tool as recited in claim 10 wherein the elevations serve as a spring device to press the first and second locking elements.

12. The power tool as recited in claim 11 wherein the elevations in the first and second cutouts extends in an axial direction only up to half a height of the first and second cutouts.

* * * * *